United States Patent
Torii

(10) Patent No.: US 11,193,252 B2
(45) Date of Patent: Dec. 7, 2021

(54) STRUCTURE FOR DETACHABLE FRONT LOADER, DETACHABLE FRONT LOADER, AND WORK VEHICLE

(71) Applicant: Kubota Corporation, Osaka (JP)

(72) Inventor: Shin Torii, Osaka (JP)

(73) Assignee: Kubota Corporation, Osaka (JP)

( * ) Notice: Subject to any disclaimer, the term of this patent is extended or adjusted under 35 U.S.C. 154(b) by 37 days.

(21) Appl. No.: 16/838,440

(22) Filed: Apr. 2, 2020

(65) Prior Publication Data

US 2020/0340203 A1 Oct. 29, 2020

(30) Foreign Application Priority Data

Apr. 24, 2019 (JP) .............................. JP2019-083287

(51) Int. Cl.
- *E02F 3/36* (2006.01)
- *B62D 49/02* (2006.01)
- *E02F 3/34* (2006.01)
- *E02F 3/627* (2006.01)

(52) U.S. Cl.
CPC ............ *E02F 3/3622* (2013.01); *B62D 49/02* (2013.01); *E02F 3/34* (2013.01); *E02F 3/627* (2013.01)

(58) Field of Classification Search
CPC ... A01B 59/062; A01B 59/064; E02F 3/3695; E02F 3/627; E02F 3/6273; E02F 9/006; E02F 9/0808
USPC .......................................... 172/273; 414/686
See application file for complete search history.

(56) References Cited

U.S. PATENT DOCUMENTS

| | | | | |
|---|---|---|---|---|
| 6,142,724 A * | 11/2000 | Hirooka | ................ | E02F 3/6273 |
| | | | | 414/686 |
| 2016/0032555 A1* | 2/2016 | Uchijima | ............. | A01B 59/064 |
| | | | | 414/686 |
| 2018/0327998 A1* | 11/2018 | Torii | ......................... | E02F 3/34 |
| 2019/0194902 A1* | 6/2019 | Boyd | ........................ | E02F 3/36 |
| 2019/0323202 A1* | 10/2019 | Nadaoka | ................ | E02F 3/968 |

FOREIGN PATENT DOCUMENTS

JP 2011-126325 A 6/2011

* cited by examiner

*Primary Examiner* — Saul Rodriguez
*Assistant Examiner* — Brendan P Tighe
(74) *Attorney, Agent, or Firm* — Osha Bergman Watanabe & Burton LLP

(57) ABSTRACT

A structure of a detachable front loader includes: a main frame; a boom; and a subframe unit that supports the boom. The subframe unit includes: a subframe; a guide that is disposed on the subframe and engages with the main frame; a lock bar that includes a pivot shaft disposed on the subframe, and a pivot shaft part; an operation tool that moves the lock bar from the restriction position to the release position against a first biasing force; and a locking tool that is supported by the subframe, moves between a locking position and an unlocking position, is biased in a locking direction, and once the operation tool moves the lock bar to the release position, moves to the locking position by a second biasing force, and engages with a cutout formed in the pivot shaft part.

20 Claims, 24 Drawing Sheets

STRUCTURE FOR DETACHABLE FRONT LOADER, DETACHABLE FRONT LOADER, AND WORK VEHICLE

BACKGROUND

Technical Field

The present invention relates to art for a detachable structure for a front loader mounted to a wheeled work vehicle such as a tractor, and a front loader and a work vehicle.

Description of Related Art

Conventionally, art for a detachable structure for a front loader mounted to a wheeled work vehicle such as a tractor is known. An example is described in Patent Literature 1.

Patent Literature 1 describes a tractor provided with a front loader for performing loading of earth and sand, or the like. The front loader is mounted on the vehicle body of a tractor via a work support part attached to a main frame.

This kind of front loader is removed from the vehicle body when it is not needed and mounted to the body when it is needed. Therefore, there is a need for a front loader that can be easily attached to and detached from a vehicle body.

PATENT LITERATURE

[Patent Literature 1] JP 2011-126325 A

SUMMARY

One or more embodiments of the present invention provide a detachable structure for a front loader that can be easily attached to and detached from a vehicle body, and a front loader and a work vehicle.

One or more embodiments of the present invention will be described.

One or more embodiments of the present invention provide an engaging part (or guide) formed on a subframe supporting a boom so as to be engageable with a main frame provided on a vehicle body; a restriction member (or lock bar) comprising a pivot shaft provided on the subframe, the restriction member pivotably supported around the pivot shaft between a restriction position for restricting movement of the main frame engaged with the engaging part and a restriction release position for allowing movement of the main frame engaged with the engaging part and biased in a restriction direction oriented to the restriction position from the restriction release position; an operation tool operable so as to pivot the restriction member from the restriction position to the restriction release position against biasing force; and a holding member (or locking tool) movably supported by the subframe between a holding position for holding the restriction member at the restriction release position and a non-holding position (or unholding position) for releasing a hold on the restriction member at the restriction release position and biased in the holding direction oriented to the holding position from the non-holding position; wherein the holding member moves to the holding position by biasing force when the operation tool moves the restriction member to the restriction release position, engages with a concave part (or cutout) provided at a pivot shaft part through which the pivot shaft is inserted, and holds the restriction member at the restriction release position.

In one or more embodiments, the holding member, during a state wherein the restriction member is held at the holding position, moves to the non-holding position side against biasing force in accordance with the main frame moving relative to a direction separated from the engaging part, and separates from the concave part to release the hold on the restriction member.

In one or more embodiments, the holding member, in the non-holding position, comes into contact with the restriction member at the restriction position, whereby movement to the holding position is restricted.

In one or more embodiments, the engaging part is provided with a hook part (or hook) for restricting movement of the main frame in a vertical direction by interposing a pin formed on the main frame from the vertical direction; and a contact surface for restricting forward movement of the main frame by making surface contact the main frame; wherein an open part (or opening) of the hook part is oriented backward in a vehicle forward and backward direction.

In one or more embodiments, the restriction member is provided with a contact part (or contact surface) for restricting movement of the main frame by making contact the main frame; and an action part (or insertion pin) for receiving force from the operation tool; and the pivot shaft part is formed between the contact part and the action part.

In one or more embodiments, the operation tool is movably supported by the subframe between a first position in contact with the action part of the restriction member at the restriction position and a second position in contact with the action part of the restriction member at the restriction release position and biased in a direction oriented to the first position from the second position; and the operation tool is formed so as to operate to move from the first position to the second position against biasing force to move the restriction member from the restriction position to the restriction release position.

In one or more embodiments, the restriction member moves at the restriction position to an intermediate position between the restriction position and the restriction release position against biasing force when the main frame moves relative to a direction approaching the engaging part; and when the main frame is engaged with the engaging part, the restriction member is moved to the restriction position by biasing force and restricts movement of the main frame engaged with the engaging part.

In one or more embodiments, the detachable structure described above is provided.

In one or more embodiments, the front loader described above is provided.

Effects such as those shown in the following are accomplished as effects of one or more embodiments of the present invention.

In one or more embodiments, a front loader is easily attached to and detached from a vehicle body. Specifically, a restriction member can be held at a restriction release position by a holding member by simply operating an operation tool. Therefore, a subframe can be easily detached from a main frame.

In one or more embodiments, since a hold on the restriction member by the holding member is automatically released, there is no need to perform work to release the hold. Thus, it is possible to reduce the burden of attaching and detaching a front loader.

In one or more embodiments, there is no need to separately prepare a member for holding the holding member at the non-holding position; therefore, the number of components can be reduced.

In one or more embodiments, the main frame can be firmly held at an engaging part. Furthermore, confirmation by an operator is easy since an opening part of a hook is oriented backward.

In one or more embodiments, the restriction member can be moved to the restriction release position by a simple configuration.

In one or more embodiments, since the operation tool automatically returns from a second position to a first position, the operation of moving the operation tool to the first position when the restriction member is moved to the restriction position can be omitted.

In one or more embodiments, the subframe can be automatically mounted to the main frame by simply moving the vehicle body.

In one or more embodiments, it is possible to provide a front loader that is easily attached to and detached from a vehicle body.

In one or more embodiments, it is possible to provide a work vehicle wherein a front loader is easily attached to and detached from the vehicle body.

DETAILED DESCRIPTION

Figure 1:
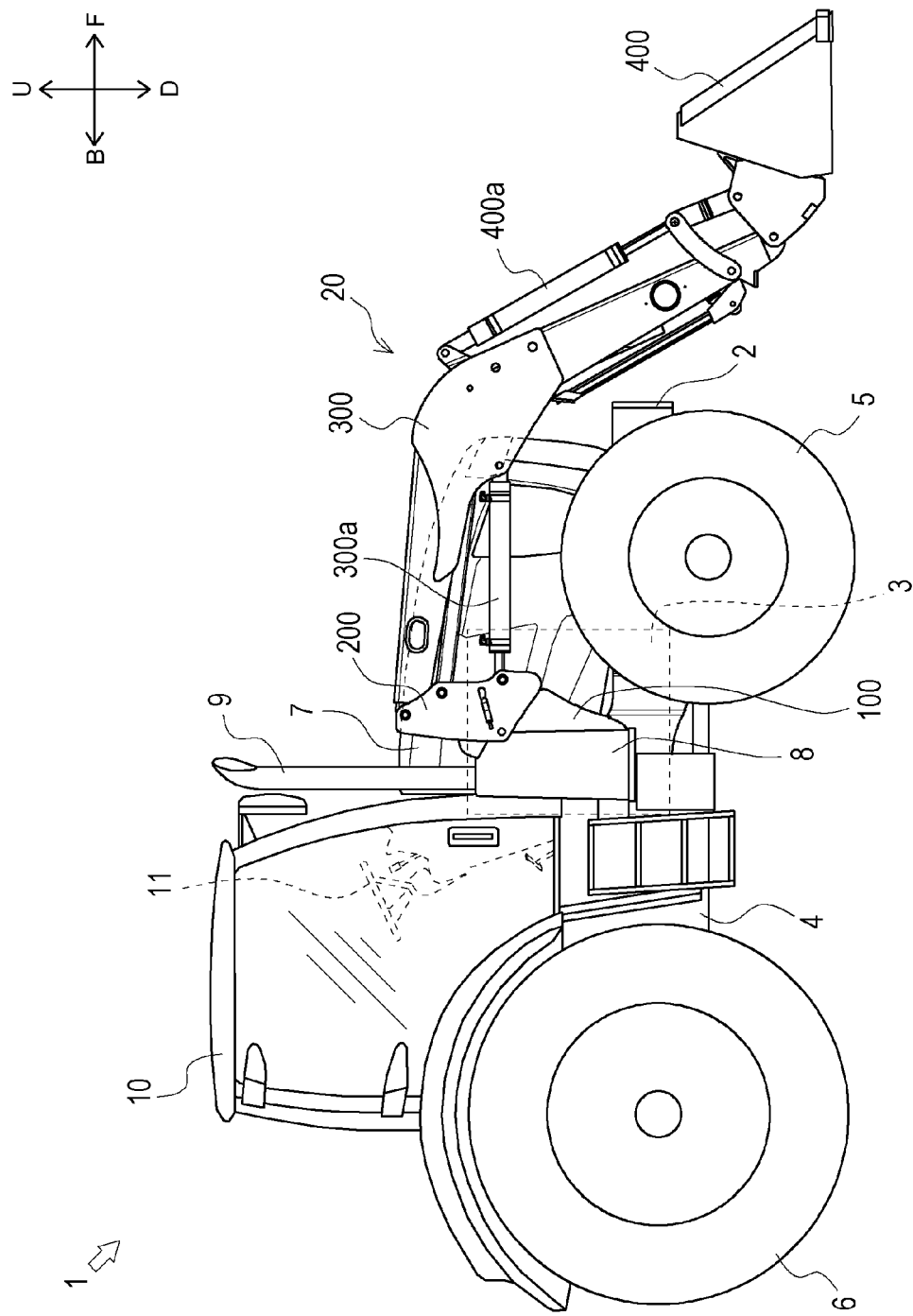
FIG. 1 is a side view illustrating a complete configuration of a tractor to which a front loader according to one or more embodiments is mounted.

The directions illustrated by arrows U, D, F, B, L, and R in the drawing define the upward, downward, forward, backward, left, and right directions, respectively, and will be described below.

Firstly, the complete configuration of a vehicle body 1 of a tractor provided with a front loader 20 according to one or more embodiments will be described using FIGS. 1 and 2.

The vehicle body 1 of the tractor is mainly provided with a machine frame 2, engine 3, transmission case 4, front wheel 5, rear wheel 6, hood 7, SCR 8, muffler 9, cabin 10, steering wheel 11, and front loader 20.

Machine frame 2 is a frame-shaped member formed by appropriately combining a plurality of plate materials. The machine frame 2 is formed in a planar substantially rectangular shape. The machine frame 2 is disposed at a front part of the vehicle body 1, wherein its longitudinal direction is oriented the forward and backward direction. The engine 3 is fixed at a back part of the machine frame 2. The transmission case 4 is fixed at a back part of the engine 3. The front part of the machine frame 2 is supported by a pair of left and right front wheels 5 via a front axle mechanism (not illustrated). The back part of the transmission case 4 is supported by a pair of left and right rear wheels 6 via a rear axle mechanism (not illustrated). The engine 3 is covered by the hood 7.

An SCR (Selective Catalytic Reduction) 8 for purifying exhaust gas of the engine 3 is disposed on the right side of the hood 7. The muffler 9 for discharging exhaust gas of the engine 3 is disposed on the upper part of the SCR 8. The SCR 8 and the muffler 9 are fixed to the transmission case 4.

After being gear shifted by a gearbox (not illustrated) accommodated in the transmission case 4, the power of the engine 3 may be transmitted to the front wheels 5 via the front axle mechanism and may be transmitted to the rear wheels 6 via the rear axle mechanism. The power of the engine 3 drives the front wheels 5 and the rear wheels 6 to rotate, and the tractor can run.

The cabin 10 is provided behind the engine 3. A living space where an operator boards is formed within the cabin 10. The steering wheel 11 for adjusting the turning angle of the front wheels 5, various operation tools (not illustrated), a seat (not illustrated) for the operator to sit down, and the like, are disposed in the living space.

The front loader 20 is mounted to the front part of the vehicle body 1. The front loader 20 is mainly provided with a pair of left and right main frames 100, a pair of left and right subframe units 200, a pair of left and right booms 300, and a bucket 400.

The machine frame 100 is fixed to the left and right of the vehicle body 1 (the machine frame 2 and the transmission case 4) respectively. The subframe unit 200 is removably supported on the upper part of each main frame 100. The boom 300 is rotatably supported by each subframe unit 200. The boom 300 is disposed so as to extend oriented forward and downward from the upper part of the main frame 100. The bucket 400 is rotatably connected to a front end part of the boom 300. The boom 300 may be rotated with respect to the subframe unit 200 by expanding and contracting a boom cylinder 300a. The bucket 400 may be rotated with respect to the boom 300 by expanding and contracting the bucket cylinder 400a. In this way, it is possible to carry out work to transport earth and sand, or the like, while rotating the boom 300 and the bucket 400 as appropriate.

Next, a detailed configuration of the main frame 100 will be described with reference to FIGS. 2, 3A, 3B, and 6. The pair of left and right main frames 100 are disposed at positions bilaterally symmetrical to each other.

Figure 2:
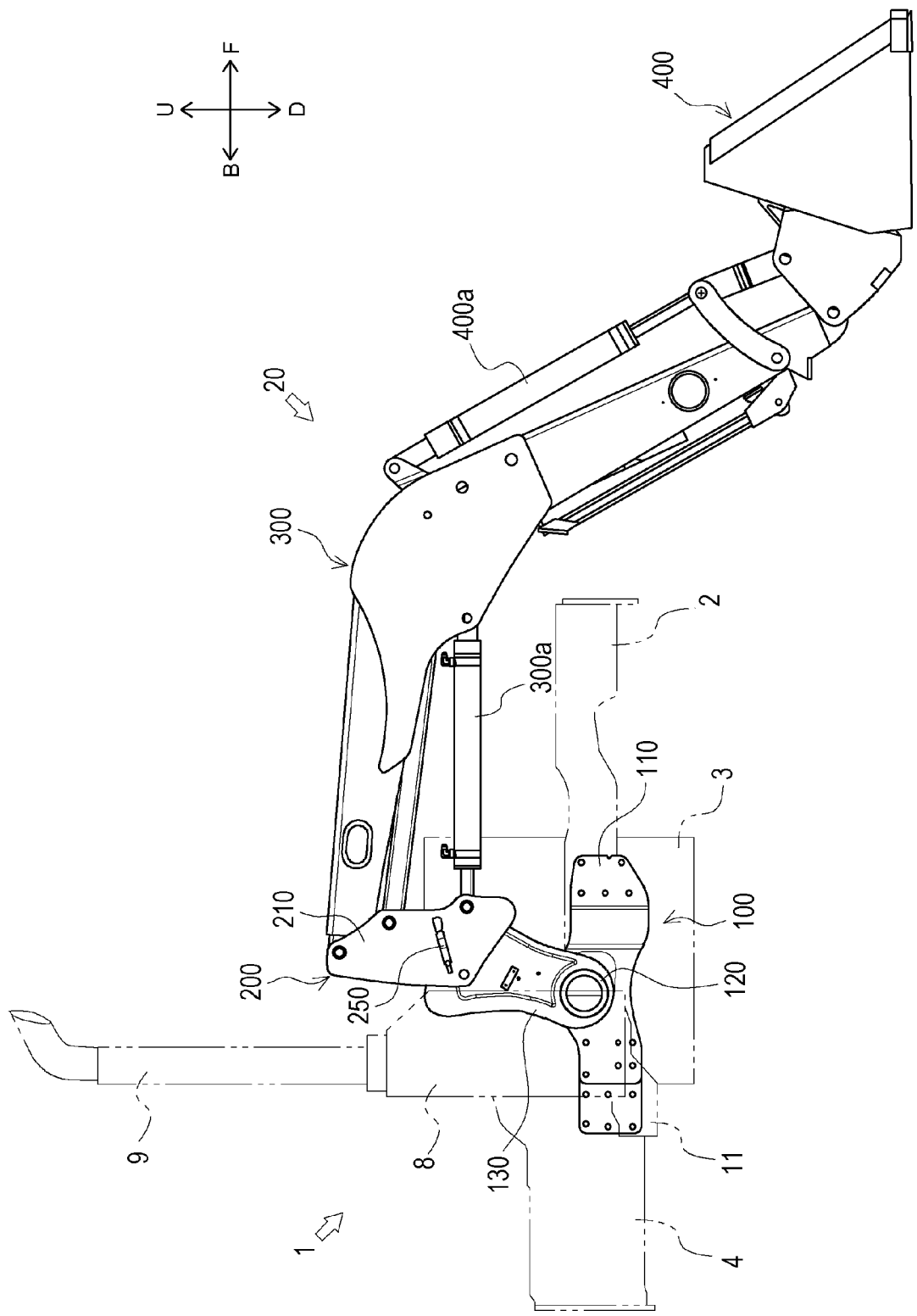
FIG. 2 is a side view illustrating a front loader attached to a machine frame or the like according to one or more embodiments.

The main frame 100 illustrated in FIG. 2 supports the subframe unit 200 that supports the boom 300. In other words, the main frame 100 supports the boom 300 via the subframe unit 200. The main frame 100 is mainly provided with a fixed frame 110, connection frame 120, and support frame 130.

The fixed frame 110 illustrated in FIG. 2 is a part fixed to the vehicle body 1. The fixed frame 110 is formed in a plate shape wherein the plate surface is oriented to the lateral direction. The fixed frame 110 is fixed to the machine frame 2 by a bolt or the like.

The connection frame 120 illustrated in FIG. 2 connects the fixed frame 110 and the support frame 130, to be described later. The connection frame 120 is formed in a substantially cylindrical shape wherein the axis thereof is oriented to the lateral direction. One end part (lateral direction inner end part) of the connection frame 120 is inserted into the fixed frame 110 and is appropriately fixed to the fixed frame 110 by welding.

The support frame 130 illustrated in FIGS. 2, 3A, 3B, and 6 is a part for supporting the subframe unit 200. The support frame 130 is formed in a plate shape wherein the plate surface is oriented to the lateral direction. The support frame 130 is disposed having the longitudinal direction oriented to the vertical direction. The connection frame 120 is inserted into the lower part of the support frame 130, and the support frame 130 and the connection frame 120 are fixed by welding. A main frame-side pin 131, a main frame-side hook 132, a main frame-side guide surface 133, a contact surface 134, and a roller 135 are formed on the support frame 130.

Figure 3A:
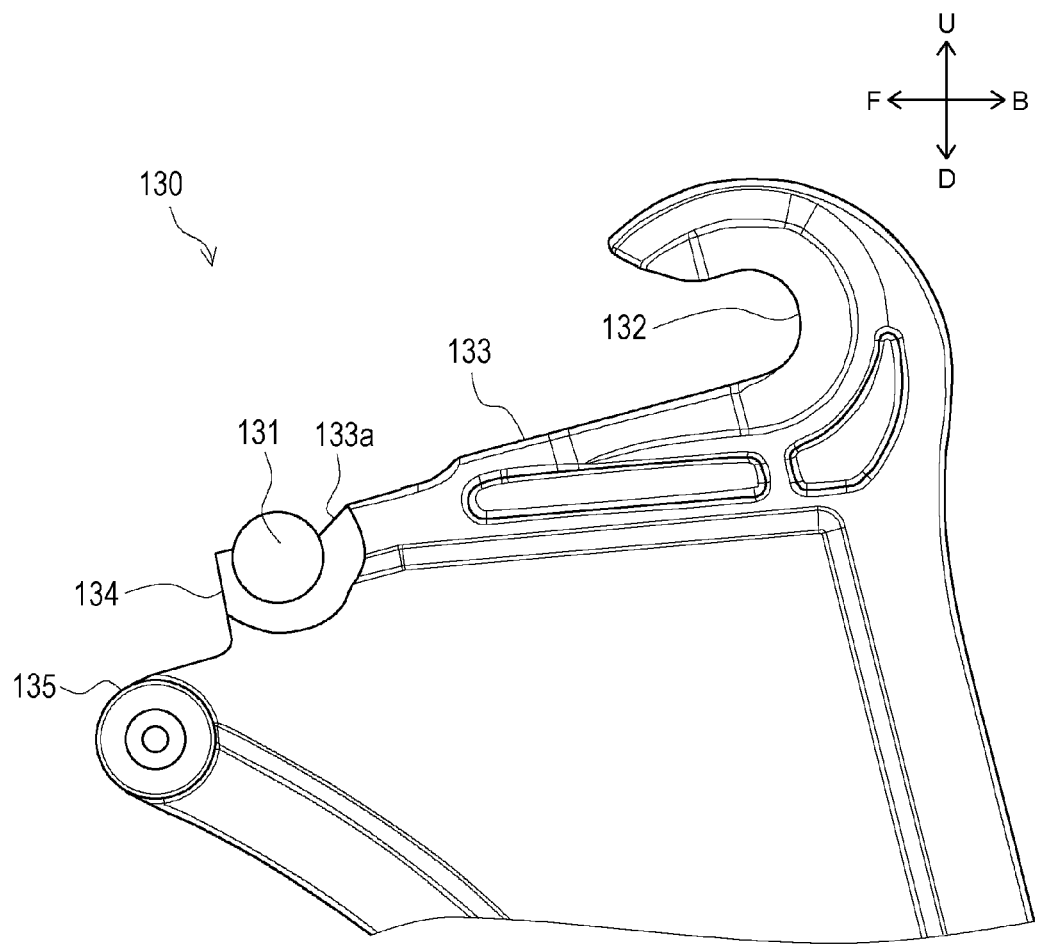
FIG. 3A is a left-side view illustrating an upper part of a main frame according to one or more embodiments.
Figure 3B:
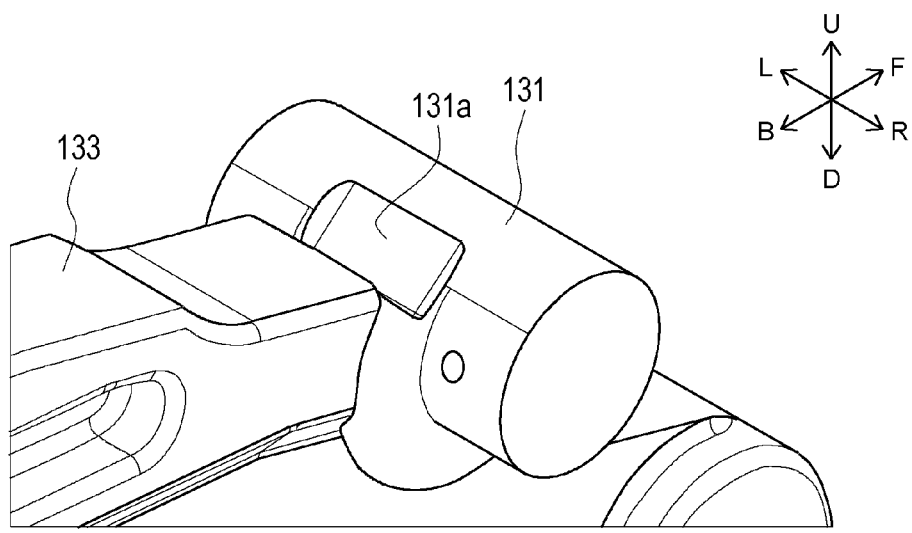
FIG. 3B is a backward and upward perspective view illustrating an upper front part of the main frame according to one or more embodiments.
Figure 6:
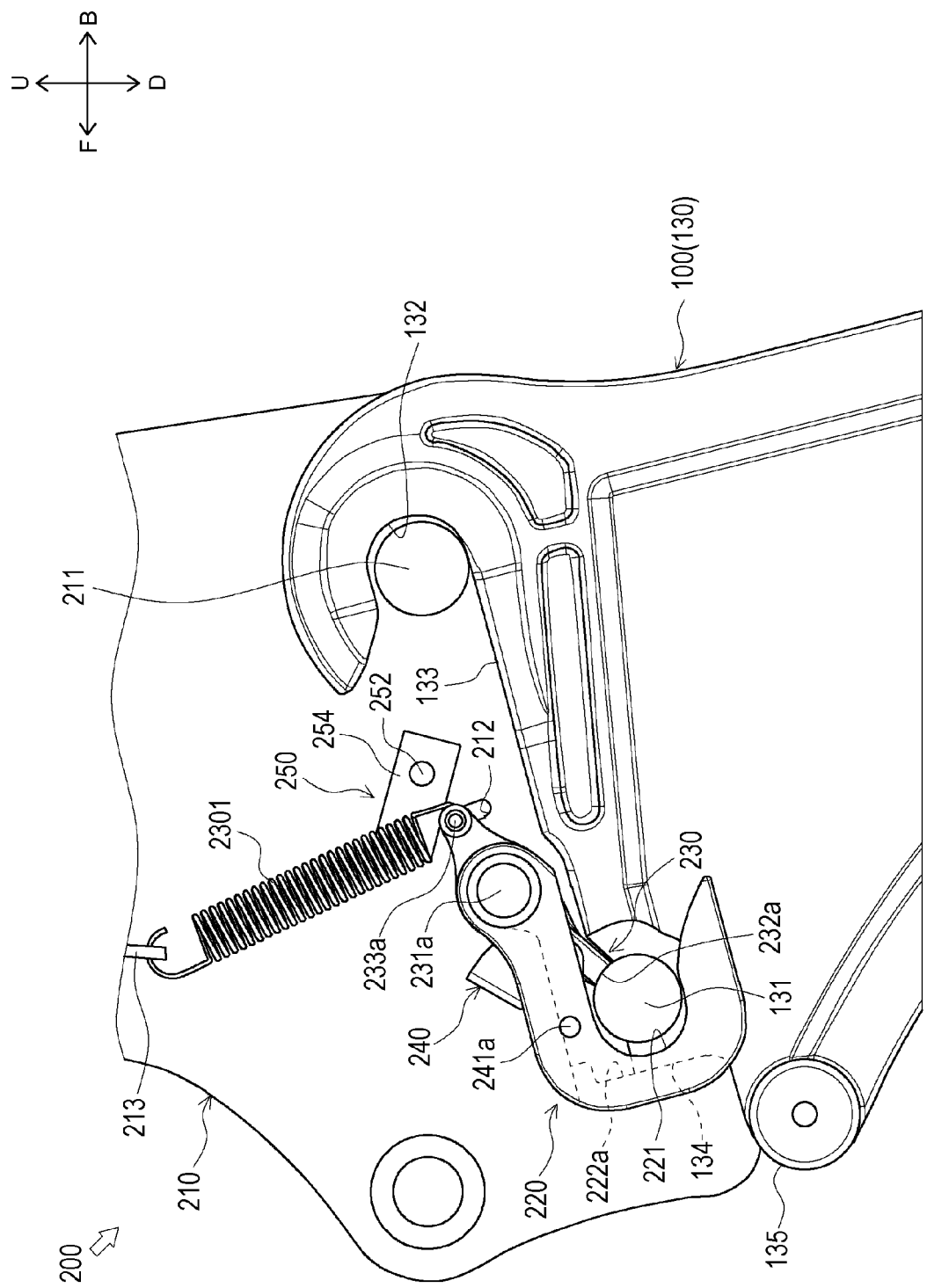
FIG. 6 is a left-side view illustrating a detachable structure of the main frame and subframe unit according to one or more embodiments.

Note that a pair of left and right support frames 130 are formed bilaterally symmetrical to each other and are disposed at positions bilaterally symmetrical to each other. FIGS. 3A, 3B, and 6 illustrate the support frame 130 on the right side from among the pair of left and right support frames 130. In the following, the support frame 130 on the right side is described unless otherwise specified, and a description of the support frame 130 on the left side will be omitted.

The main frame-side pin 131 illustrated in FIGS. 3A, 3B, and 6 is a part held by the subframe unit 200 (more specifically, a hook or hook part 221 of the guide 220) to be described later. The main frame-side pin 131 is formed at the front upper end part of the support frame 130 in a cylindrical shape wherein the axis thereof is oriented to the lateral direction. The main frame-side pin 131 is formed so as to project left and right from the side surface of the support frame 130. A cutout or concave part 131a is formed on the main frame-side pin 131.

The concave part 131a illustrated in FIG. 3B is formed so that the left and right center of the back upper part of the main frame-side pin 131 is cutout or concave. The concave part 131a is formed in a planar shape wherein the surface is oriented backward and upward.

The main frame-side hook 132 illustrated in FIGS. 3A and 6 is a part holding the subframe unit 200 (more specifically, a subframe-side pin 211 of a subframe 210), to be described later. The main frame-side hook 132 is formed substantially U-shaped having an open front in a side view, and this can support the subframe-side pin 211, to be described later, from below. The main frame-side hook 132 is formed at the back upper end part of the support frame 130 and above the main frame-side pin 131.

The main frame-side guide surface 133 illustrated in FIGS. 3A, 3B, and 6 is for guiding the subframe unit 200 (more specifically, the subframe-side pin 211 of the subframe 210) to an attachment position when the subframe unit 200, to be described later, is mounted on the main frame 100. The main frame-side guide surface 133 is formed at the upper end part of the support frame 130 in a planar shape wherein the surface thereof is oriented to substantially upward. More specifically, the main frame-side guide surface 133 is formed between the main frame-side pin 131 and the main frame-side hook 132 in an ascending sloped shape in which the height in the vertical direction decreases toward the front. A cutout or concave part 133a is formed on the main frame-side guide surface 133.

The concave part 133a is formed so that the front end of the main frame-side guide surface 133 (a part adjacent to the main frame-side pin 131) is cutout or concave. The concave part 133a is formed so that the angle with respect to the horizontal direction is larger (so that it becomes a steeper angle) than the other parts of the main frame-side guide surface 133.

The contact surface 134 illustrated in FIG. 3A is a surface contacting a connecting part 222 (target contact surface 222a) of the guide 220, to be described later. The contact surface 134 is formed in front of the main frame-side pin 131. The contact surface 134 is formed such that the surface is oriented substantially forward.

Next, a detailed configuration of the subframe unit 200 will be described using FIGS. 4 to 11. Note that the pair of left and right subframe units 200 are formed bilaterally symmetrical to each other, and FIGS. 4 to 6, 10A, 10B, and 11 (and FIGS. 12 to 21, to be described later) illustrate the subframe unit 200 on the right side from among the pair of left and right subframe units 200. In the following, the subframe unit 200 on the right side is described unless otherwise specified, and a description of the subframe unit 200 on the left side will be omitted. Furthermore, FIGS. 4 to 6 illustrate a state wherein the subframe unit 200 is mounted on the main frame 100 (mounted state), and in the following, the description will be given based on this mounted state.

The subframe unit 200 is a part provided between the main frame 100 and the boom 300. The subframe unit 200 rotatably supports the boom 300 at its upper part (see FIG. 2). The subframe unit 200 is provided with a subframe 210, a guide 220, a lock bar 230, a tension coil spring 2301, a locking tool or detent 240, a torsion coil spring 2401, an operation lever 250, a torsion coil spring 2501, and an indicator 260.

The subframe 210 illustrated in FIGS. 4 to 6, 10A, 10B, and 11 is a part configuring the left part and right part of the subframe unit 200. The subframe 210 is formed in a plate shape wherein the plate surface is oriented to the lateral direction. The subframe 210 is disposed having the longitudinal direction oriented to the vertical direction. The subframe 210 is provided in a pair on the left and right. Note that in FIGS. 5, 6, and 11 (and FIGS. 12 to 21, to be described later), an illustration of the subframe 210 on the left side is omitted for convenience of description. The subframe-side pin 211, a restriction hole 212, and an intermediate plate 213 are formed on the subframe 210.

Figure 4:
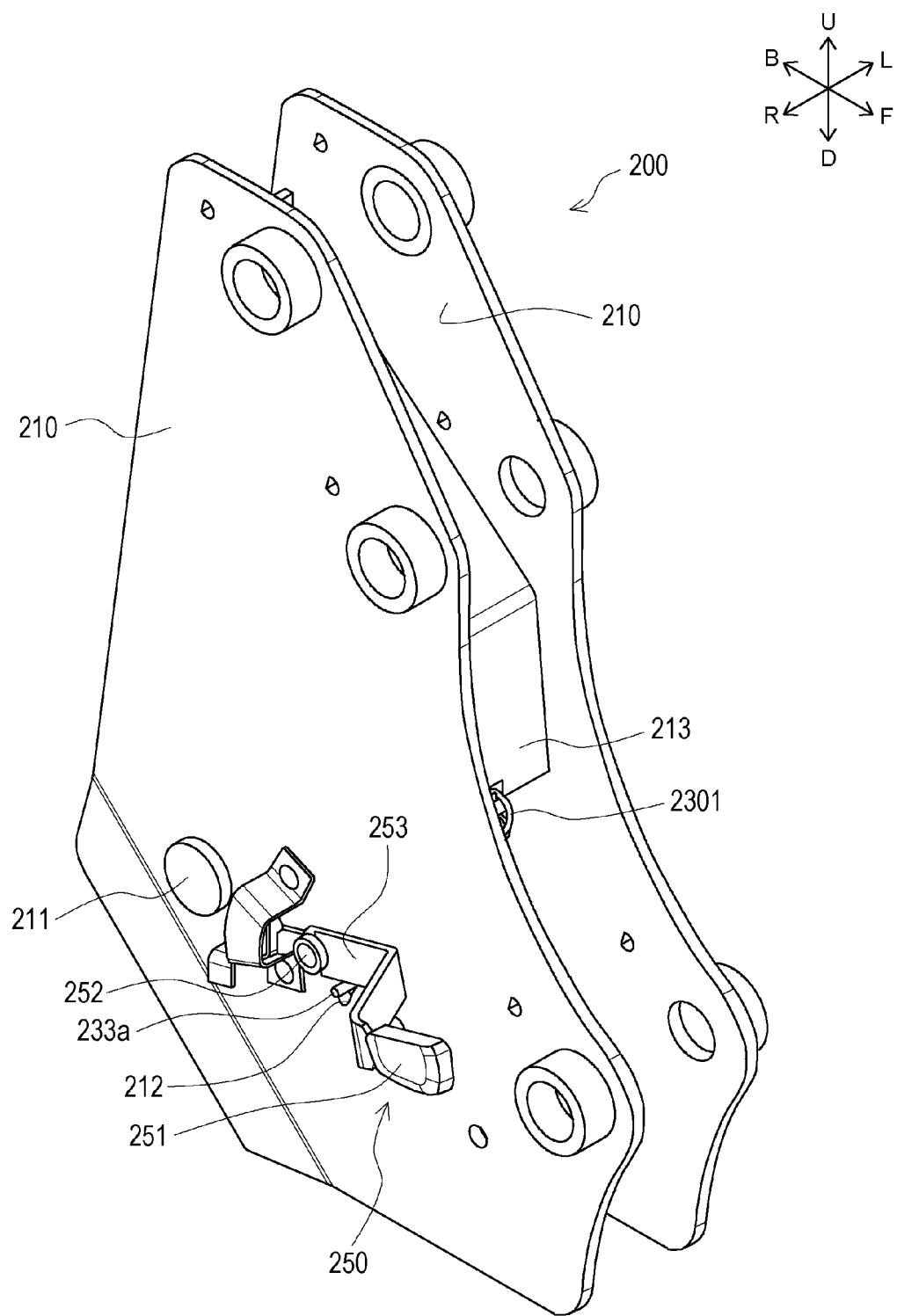
FIG. 4 is a right upper perspective view illustrating a subframe unit according to one or more embodiments.
Figure 5:
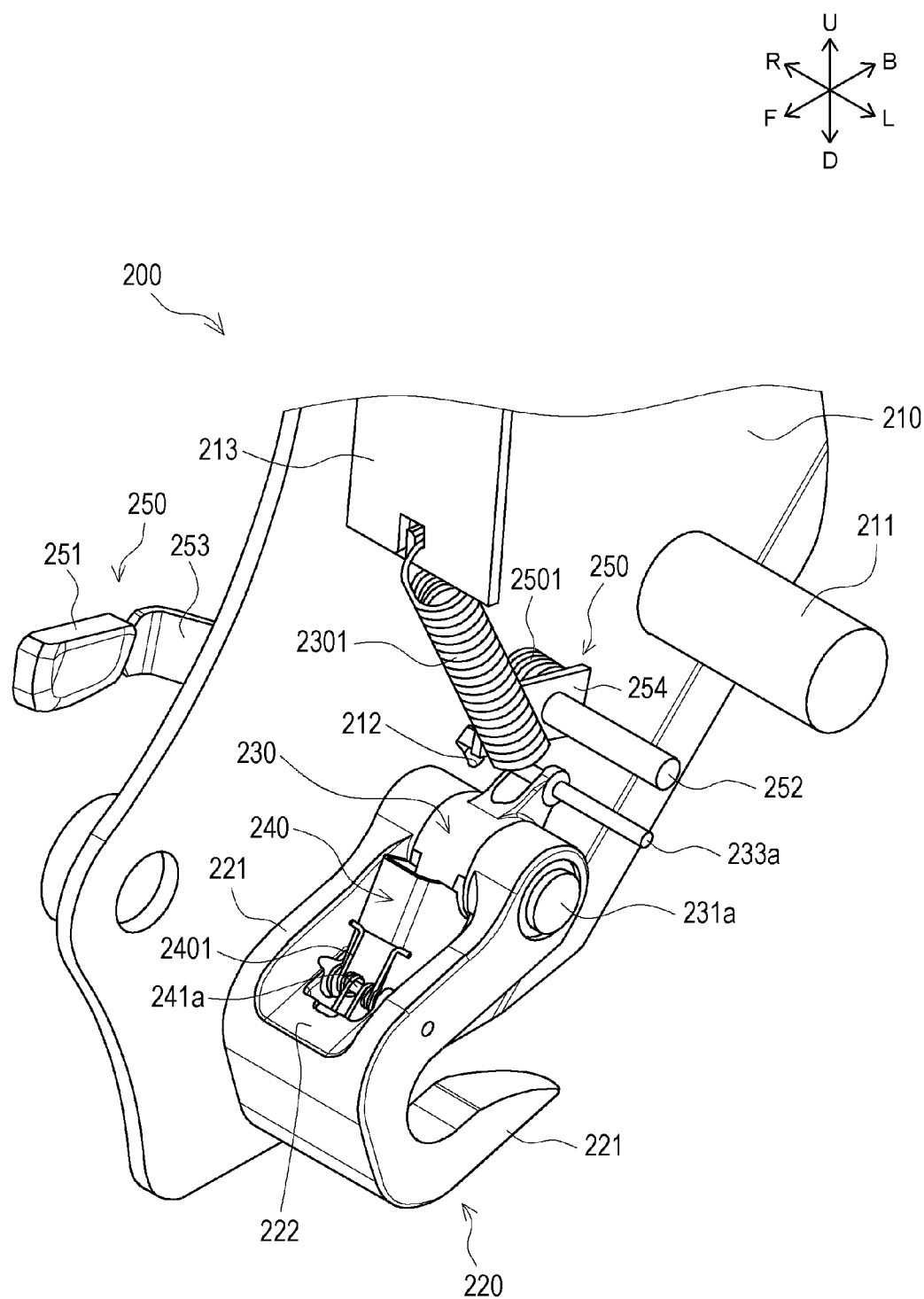
FIG. 5 is a left upper perspective view illustrating a lower part of the subframe unit according to one or more embodiments.

The subframe-side pin 211 illustrated in FIGS. 4 to 6 is a part held by the main frame-side hook 132 (see FIG. 3A) of the support frame 130. The subframe-side pin 211 is formed in a cylindrical shape. The subframe-side pin 211 is fixed to the back lower part of the subframe 210 in a state wherein the axis is oriented the lateral direction. The subframe-side pin 211 is provided between the pair of left and right subframes 210 so as to connect the pair of left and right subframes 210.

The restriction hole 212 illustrated in FIGS. 4 to 6, 10A, and 11 is for restricting the operation range of the lock bar 230 to be described later. The restriction hole 212 is formed so as to penetrate the subframe 210 in the lateral direction. The restriction hole 212 is formed partially annular, centered on the axis of a pivot shaft 231a, to be described later, in a side view (see FIGS. 11 and 13). The restriction hole 212 is formed behind and above the pivot shaft 231a.

The intermediate plate 213 illustrated in FIGS. 4 to 6 is provided between the pair of left and right subframes 210. The intermediate plate 213 is formed so as to mutually connect the pair of left and right subframes 210. The intermediate plate 213 is formed such that its lower end part is located in front of and above the restriction hole 212.

Figure 7:
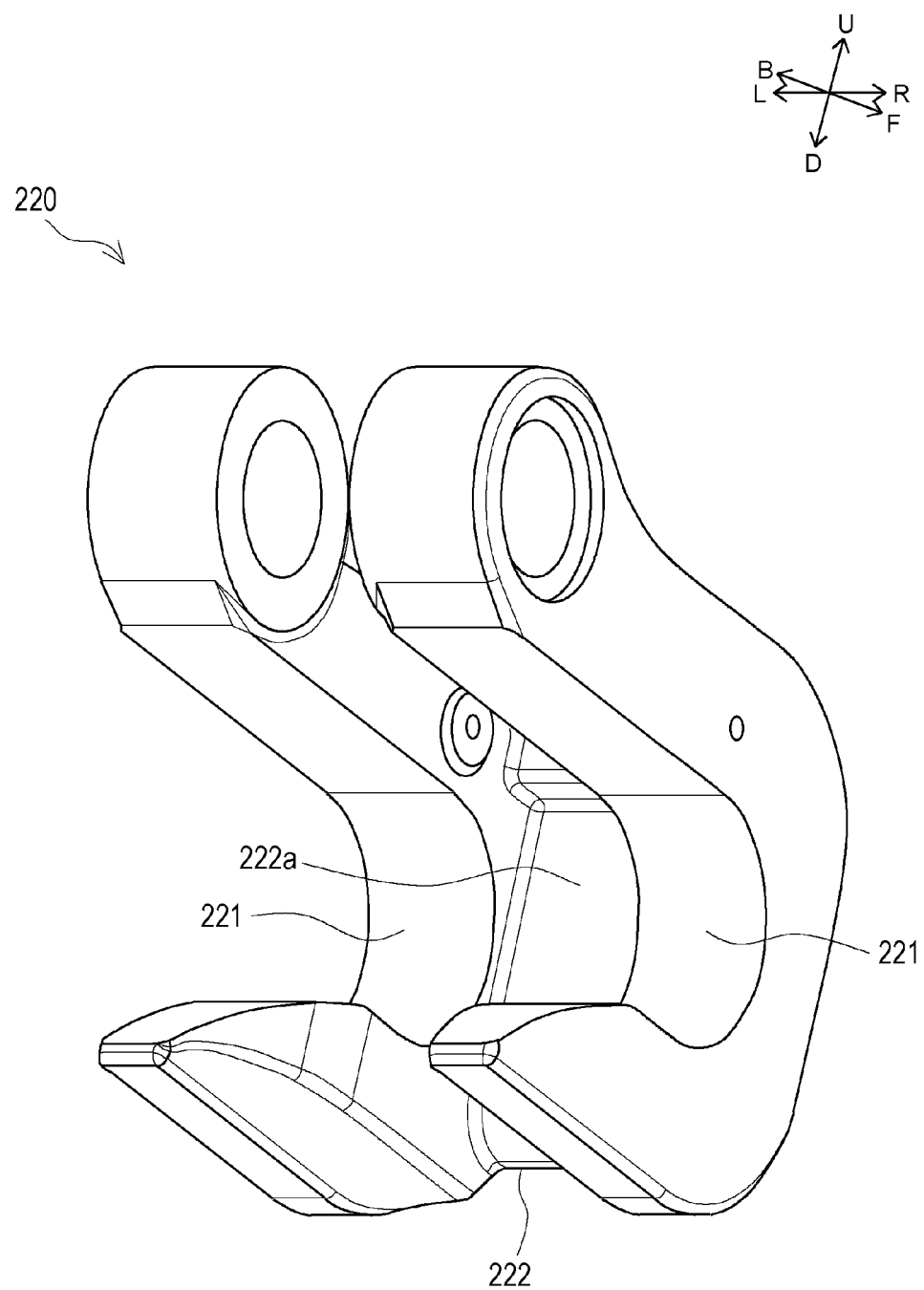
FIG. 7 is a forward and downward perspective view illustrating a guide according to one or more embodiments.

The guide 220 illustrated in FIGS. 5 to 7 is for guiding the main frame 100 to the attachment position and engaging with the main frame 100 (holding) at the attachment position when the subframe unit 200 is mounted on the main frame 100. The guide 220 is fixed to each inner surface of the pair of left and right subframes 210. The hook part 221 and connecting part 222 are formed on the guide 220.

The hook part 221 is a part for engaging with the main frame-side pin 131 and holding the main frame-side pin 131. The hook part 221 is formed substantially U-shaped having an open back in a side view (so that the opening or open part is oriented backward). In this way, the hook part 221 is formed in a shape so as to interpose the main frame-side pin 131 from the vertical direction and can support the main frame-side pin 131 from below. The hook part 221 is formed at each left and right end part of the guide 220. Vertical movement of the main frame 100 is restricted by the hook part 221 holding the main frame-side pin 131.

The connecting part 222 illustrated in FIGS. 5 and 7 is a part connecting the pair of left and right hook parts 221. The connecting part 222 is formed so as to intervene between the pair of left and right hook parts 221. The target contact surface 222a is formed on the connecting part 222.

The target contact surface 222a illustrated in FIG. 7 is a part making contact the contact surface 134 of the support frame 130. The target contact surface 222a is formed such that the surface is oriented substantially backward. The target contact surface 222a is formed so as to be parallel to the contact surface 134 (see FIG. 3A).

The lock bar 230 illustrated in FIGS. 5, 6, 8, and 11 is for restricting (locking) backward movement of the main frame 100. The lock bar 230 is disposed having the longitudinal direction oriented forward and downward (backward and upward). The lock bar 230 is provided with a lock central part 231, a lock lower part 232, and a lock upper part 233.

Figure 8:
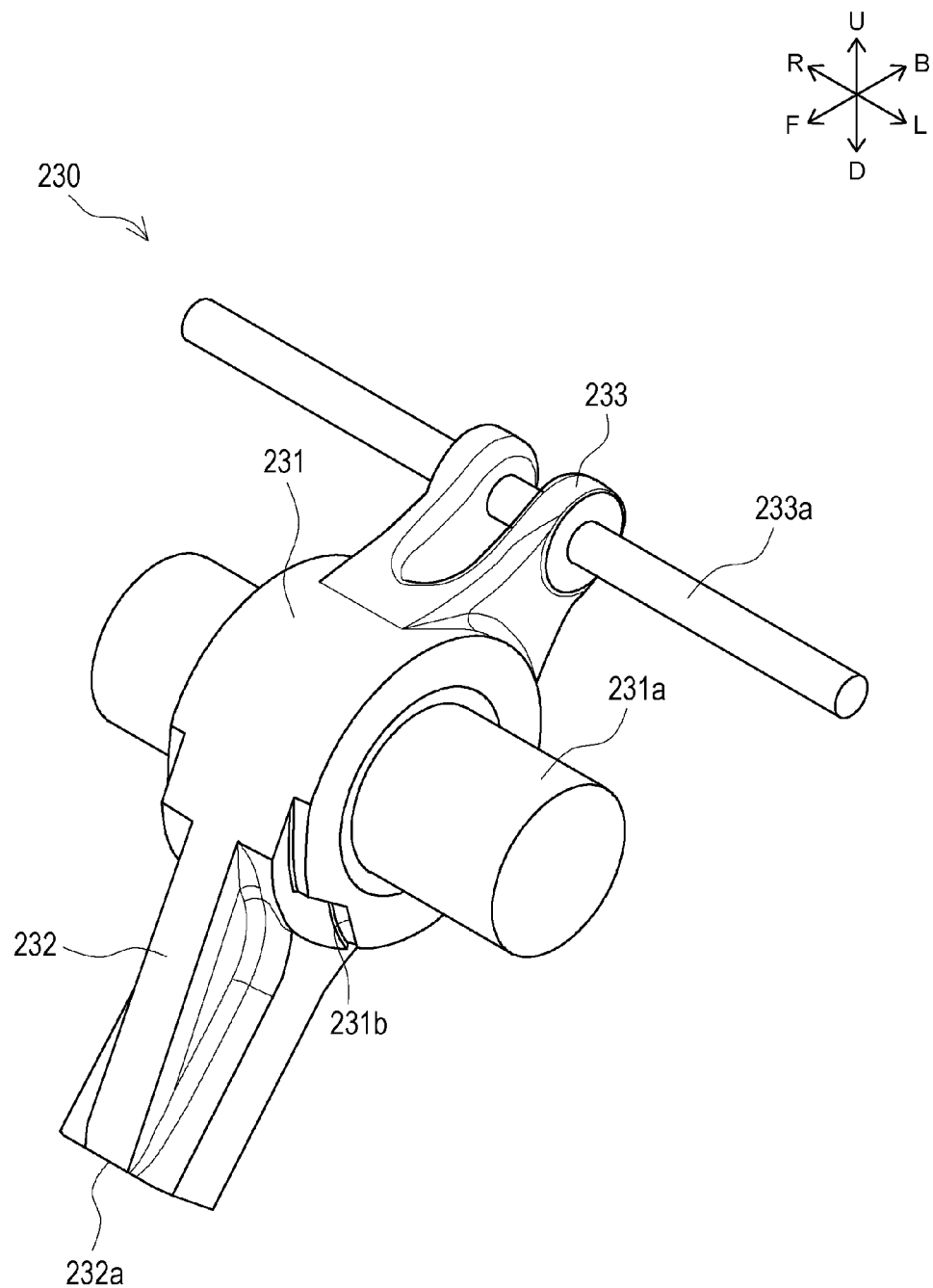
FIG. 8 is a left upper perspective view illustrating a lock bar according to one or more embodiments.

The lock center part 231 illustrated in FIG. 8 is a part configuring the center part of the lock bar 230. The lock center part 231 is formed in a cylindrical shape wherein the axis thereof is oriented to the lateral direction. The lock center part 231 is provided with the pivot shaft 231a. Furthermore, a cutout or concave part 231b is formed on the lock center part 231.

The pivot shaft 231a illustrated in FIGS. 5, 6, 8, and 10A is a part serving as the pivot center of the lock bar 230. The pivot shaft 231a is disposed having its axis oriented to the lateral direction. The pivot shaft 231a is formed so as to be inserted inside the lock central part 231 and to protrude outward from the lock center part 231 in the lateral direction. The pivot shaft 231a is disposed so as to span between the pair of left and right subframes 210. The pivot shaft 231a is rotatably supported by each of the pair of left and right subframes 210 behind and above the part of the hook part 221 that holds the main frame-side pin 131.

Figure 11:
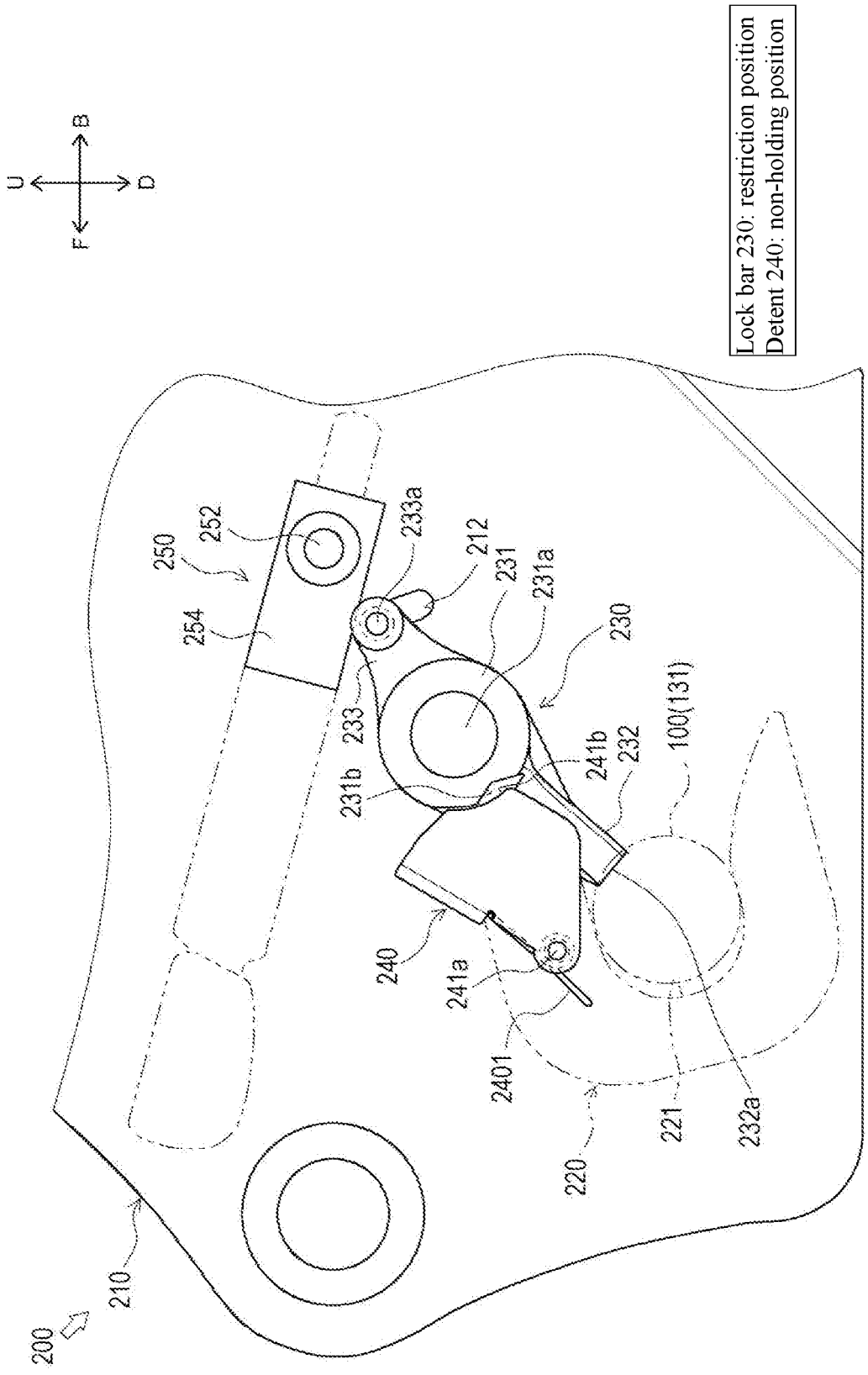
FIG. 11 is a left-side view illustrating a part of the subframe unit in a mounted state according to one or more embodiments.

The concave part 231b illustrated in FIGS. 8 and 11 is formed on the left side surface and right side surface, respectively, of the lock center part 231. The concave part 231b is formed so that the front lower part of the left side surface and the right side surface of the lock center part 231 is cutout or concave, and it is cut out in a triangular shape in a side view.

The lock lower part 232 illustrated in FIG. 8 is a part configuring the lower part of the lock bar 230. The lock lower part 232 is formed so as to extend forward and downward from the lock center part 231. A contact surface 232a is formed on the lock lower part 232.

The contact surface 232a illustrated in FIG. 8 is a part making contact the main frame-side pin 131. The contact surface 232a is formed at a lower end of the lock lower part 232. The contact surface 232a is formed in a planar shape wherein the surface is oriented forward and downward. The contact surface 232a contacts the concave part 131a of the main frame-side pin 131 while in a mounted state to restrict movement of the main frame 100. The contact surface 232a is formed so as to be disposed in front of and below the pivot shaft 231a.

The lock upper part 233 illustrated in FIG. 8 is a part configuring the upper part of the lock bar 230. The lock upper part 233 is formed so as to extend backward and upward from the lock center part 231. The lock upper part 233 is provided with an insertion pin 233a.

The insertion pin 233a illustrated in FIGS. 5, 6, 8, 10A, 10B, and 11 is disposed having the longitudinal direction oriented to the lateral direction. The insertion pin 233a is inserted into a back end (upper end) part of the lock upper part 233 and is fixed to this back end part. The insertion pin 233a is formed so as to protrude outward from the lock upper part 233 in the lateral direction. Each left and right end part of the insertion pin 233a is inserted into each restriction hole 212 of the pair of left and right subframes 210. The insertion pin 233a is disposed behind and above the pivot shaft 231a.

The lock bar 230 formed in this way is pivotably supported by the subframe 210 around the axis of the pivot shaft 231a. Furthermore, inserting the insertion pin 233a through the restriction hole 212 restricts the pivot range of the lock bar 230.

The lock bar 230 is biased (i.e., a first biasing force is applied to the lock bar 230) by the tension coil spring 2301 illustrated in FIGS. 5 and 6. One end of the tension coil spring 2301 is locked by the insertion pin 233a. The other end of the tension coil spring 2301 is locked by a lower end part of the intermediate plate 213. The insertion pin 233a is biased substantially upward (forward and upward) by the tension coil spring 2301 provided in this manner.

The lock bar 230 is biased by the tension coil spring 2301 disposed in this way so as to rotate in a counterclockwise direction as viewed from the left side (see FIG. 6).

The detent 240 illustrated in FIGS. 5, 6, 9, and 11 is a member for holding the lock bar 230. The detent 240 is provided with a detent-side surface part 241 and a connecting part 242.

Figure 9:
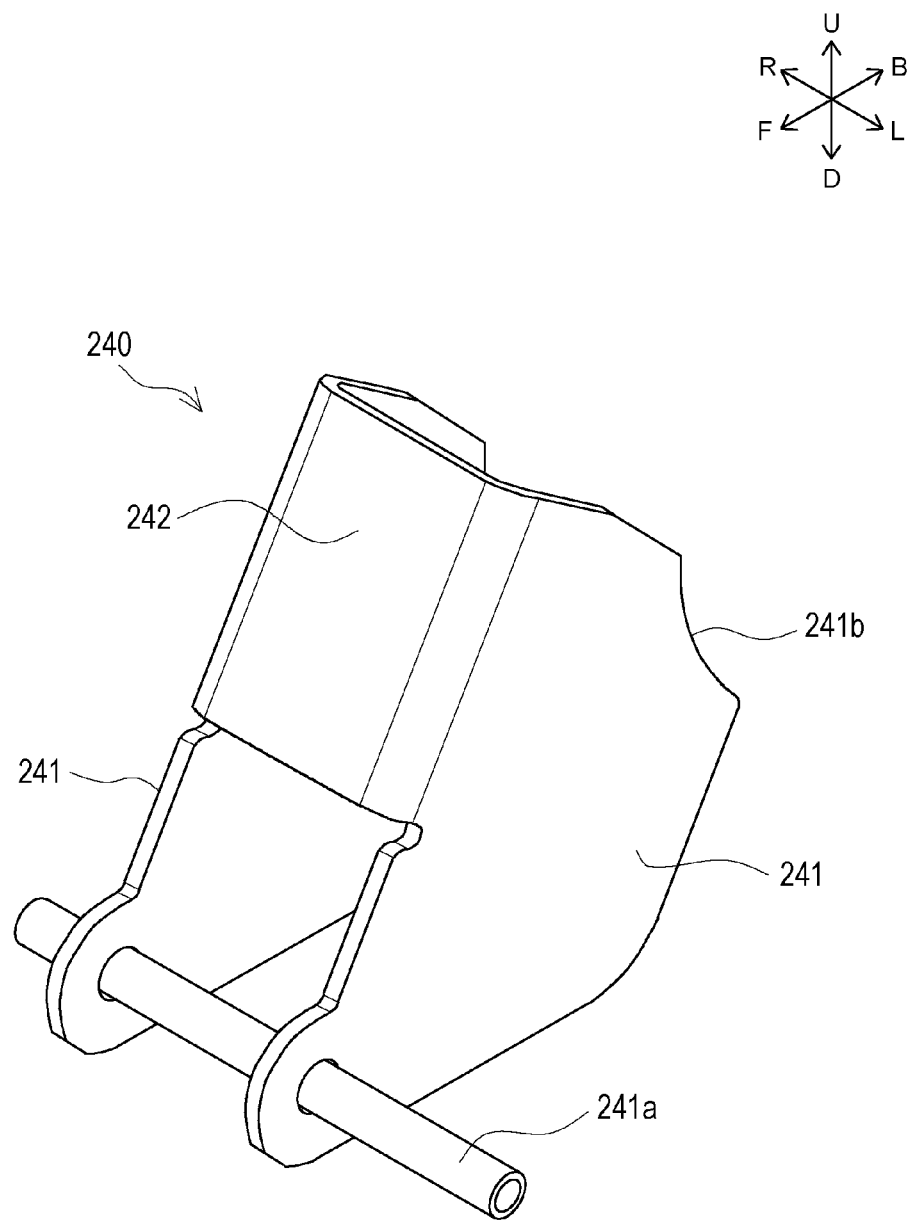
FIG. 9 is a left upper perspective view illustrating a detent according to one or more embodiments.

The detent-side surface part 241 illustrated in FIG. 9 is a part configuring the left and right-side surface part of the detent 240. The detent-side surface part 241 is formed as a left and right pair. The detent-side surface part 241 is formed in a plate shape wherein the plate surface is oriented to the lateral direction. The detent-side surface part 241 is provided with a pivot shaft 241a. Furthermore, a notch part 241b is formed on the detent-side surface part 241.

The pivot shaft 241a illustrated in FIGS. 5, 6, 9, and 11 is a part serving as the pivot center of the detent 240. The pivot shaft 241a is disposed having its axis oriented to the lateral direction. The pivot shaft 241a is formed so as to be inserted through the front lower part of detent-side surface part 241 and to protrude outward from the detent-side surface part 241 in the lateral direction. Each left and right end part of the pivot shaft 241a is rotatably supported by the pair of left and right hook parts 221, respectively, in front of the pivot shaft 231a. The pivot shaft 241a is disposed in front of and below the pivot shaft 231a. Furthermore, the pivot shaft 241a is disposed in front of and above the contact surface 232a.

The notch part 241b illustrated in FIGS. 9 and 11 is formed at each pair of left and right detent-side surface parts 241. The notch part 241b is formed such that the back end part of the detent-side surface part 241 is cut out in an arc shape in a side view. The notch part 241b is formed in an arc shape centered on the axis of the pivot shaft 231a of the lock bar 230 in a side view.

The connecting part 242 illustrated in FIG. 9 is a part connecting the pair of left and right detent-side surface parts 241. The connecting part 242 is formed so as to intervene between the pair of left and right detent-side surface parts 241. The connecting part 242 is formed so as to be perpendicular to the detent-side surface part 241.

The detent 240 formed in this way is pivotably supported by the guide 220 around the axis of the pivot shaft 241a. Furthermore, the detent 240 is formed such that the notch part 241b can engage mutually with the concave part 231b of the lock bar 230 at a predetermined position.

The detent 240 is biased (i.e., a second biasing force is applied to the detent 240) by the torsion coil spring 2401 illustrated in FIGS. 5 and 11. The torsion coil spring 2401 is provided such that the pivot shaft 241a is inserted into the center thereof.

The detent 240 is biased by the torsion coil spring 2401 disposed in this way so as to rotate in a clockwise direction as viewed from the left side (see FIG. 6).

The operation lever 250 illustrated in FIGS. 4 to 6, 10A, and 11 is for rotating the lock bar 230 when removing the subframe unit 200 from the main frame 100. The operation lever 250 is provided with a grip part 251, a pivot shaft 252, a connecting plate 253, and an action part 254.

Figure 10A:
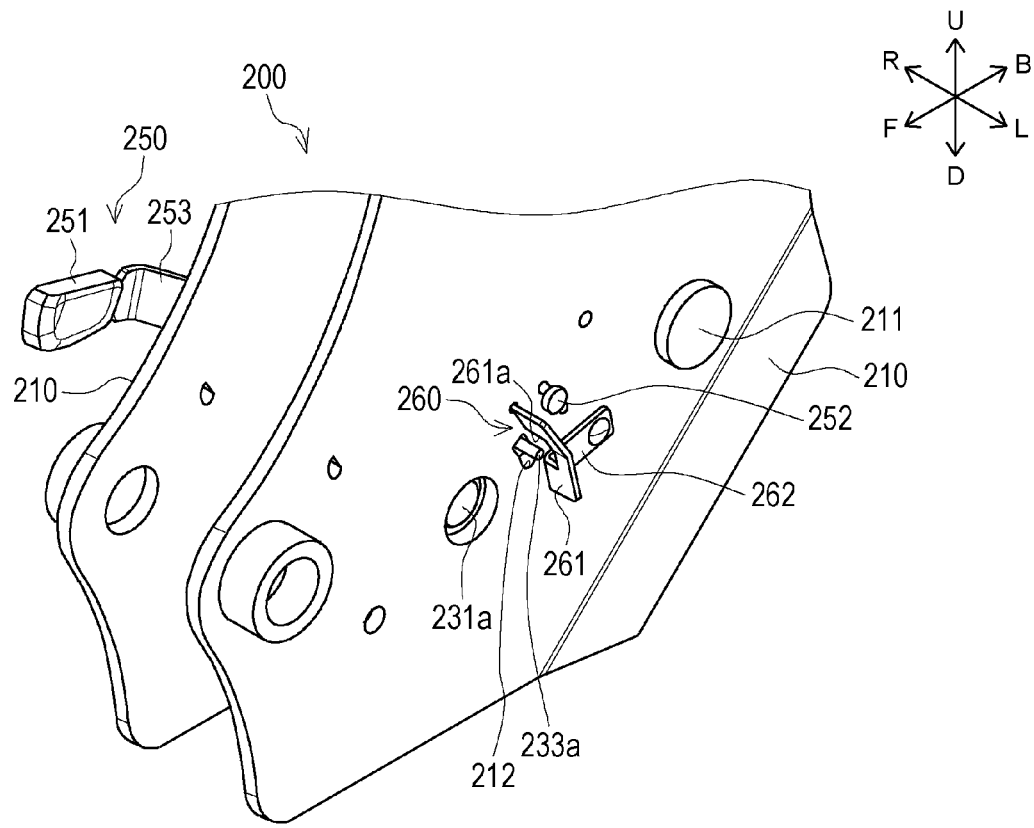
FIG. 10A is a left upper perspective view illustrating a lower part of the subframe unit according to one or more embodiments.

The grip part 251 illustrated in FIGS. 4, 5, and 10A is a part gripped by an operator. The grip part 251 is provided on the outside (outside of the vehicle body 1 in the lateral direction) of the subframe 210. The grip part 251 is formed in an appropriate shape that is easy for an operator to grip.

The pivot shaft 252 illustrated in FIGS. 4 to 6, 10A, and 11 is a part serving as the pivot center of the operation lever 250. The pivot shaft 252 is formed having its axis oriented to the lateral direction. The pivot shaft 252 is provided so as to penetrate the pair of left and right subframes 210 above and behind the restriction hole 212 and the insertion pin 233a. The pivot shaft 252 is disposed behind and above the insertion pin 233a.

The connecting plate 253 illustrated in FIGS. 4, 5, and 10A connects the grip part 251 and the pivot shaft 252. The connecting plate 253 is formed by appropriately bending a plate material. The connecting plate 253 is provided on the outside (outside of the vehicle body 1 in the lateral direction) of the subframe 210. The grip part 251 is fixed to one end of the connecting plate 253. A right end part of the pivot shaft 252 is fixed to the other end of the connecting plate 253.

The action part 254 illustrated in FIGS. 5, 6, and 11 is a part for applying force to the insertion pin 233a of the lock bar 230. The action part 254 is formed in a substantially rectangular plate shape. The action part 254 is provided with the plate surface oriented to the lateral direction. The action part 254 is provided between the pair of left and right subframes 210. The action part 254 is fixed to the pivot shaft 252 with an interval in the lateral direction with respect to the connection plate 253.

The operation lever 250 formed in this way is pivotably supported by the subframe 210 around the axis of the pivot shaft 252. Furthermore, the operation lever 250 is formed so that the lower end part of the action part 254 contacts the insertion pin 233a at a predetermined position.

The operation lever 250 is biased (i.e., a third biasing force is applied to the operation lever 250) by the torsion coil spring 2501 illustrated in FIG. 5. The torsion coil spring 2501 is provided such that the pivot shaft 252 is inserted into the center thereof.

The operation lever 250 is biased by the torsion coil spring 2501 disposed in this way so as to rotate in a clockwise direction as viewed from the left side (see FIG. 6).

Figure 10B:
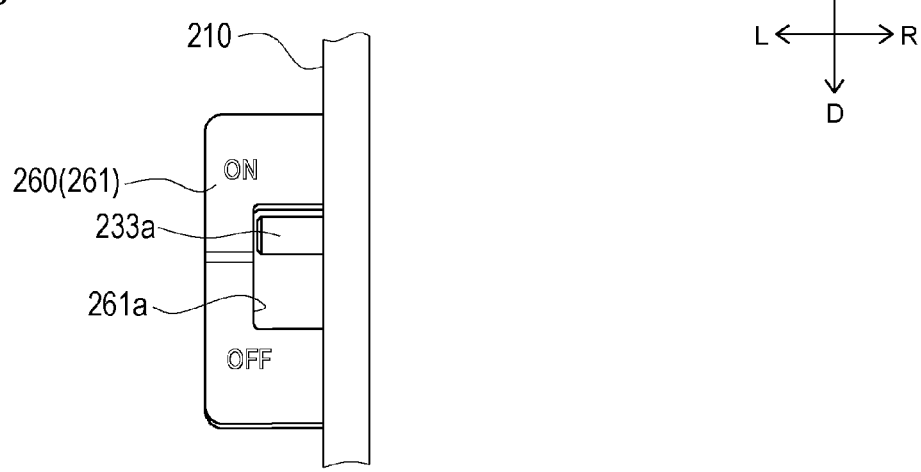
FIG. 10B is a rear enlarged view illustrating an indicator and a periphery thereof according to one or more embodiments.

The indicator 260 illustrated in FIGS. 10A and 10B is for notifying an operator of the state (position) of the lock bar 230. The indicator 260 is formed by appropriately bending a plate material. Of the pair of left and right subframes 210, the indicator 260 is provided on the left-side subframe 210 (inside the vehicle body 1 in the lateral direction). The indicator 260 is provided on the left surface of the left-side subframe 210. The indicator 260 is disposed immediately behind the restriction hole 212 and the insertion pin 233a. The indicator 260 is provided with a display part 261 and a target fixed part 262.

The display part 261 displays the position of the insertion pin 233a. The display part 261 is formed in a substantially rectangular plate shape wherein the plate surface is oriented to substantially in the forward and backward direction. On the back surface of the display part 261, "ON" is shown at the upper part and "OFF" is shown at the lower part. "ON" shown on the display part 261 indicates the lock bar 230 is at the restriction position. "OFF" shown on the display part 261 indicates the lock bar 230 is at the restriction release position. Note that the "restriction position" and "restriction release position" will be described later. A notch part 261a is formed on the display part 261 so that an operator in the cabin 10 can visually recognize the protruding part of the insertion pin 233a.

The target fixed part 262 is a part fixed to the subframe 210. The target fixed part 262 is formed so as to extend backward from the right end of the display part 261, and it is fixed by a bolt, nut, or the like to the inside of the subframe 210 in the lateral direction.

Next, the method of removing the front loader 20 (more specifically, parts of the front loader 20 excluding the main frame 100) from the vehicle body 1 will be described using FIGS. 6 and 11 to 18.

FIGS. 6 and 11 illustrate a state wherein the subframe unit 200 is mounted on the main frame 100 (mounted state). In the mounted state, the main frame-side pin 131 is engaged with the hook part 221 of the guide 220 and is held by the hook part 221. Furthermore, in the mounted state, the subframe-side pin 211 is engaged with the main frame-side hook 132 and is held by the main frame-side hook 132 (see FIG. 6). Vertical movement of the main frame 100 is thereby restricted.

In the mounted state, the contact surface 134 (see FIG. 3A) of the main frame 100 makes surface contact (makes contact with) the target contact surface 222a (see FIG. 7) of the subframe unit 200. Forward movement of the main frame 100 (main frame-side pin 131) is thereby restricted.

In this way, in the mounted state, the main frame 100 (main frame-side pin 131) is not only interposed from the vertical direction by the hook part 221, but it is also supported by the target contact surface 222a making surface contact the main frame 100 (contact surface 134) from the front; thus, the main frame 100 can be firmly held to the guide 220.

In the mounted state, since the lock bar 230 is biased in a counterclockwise direction as viewed from the left side by the tension coil spring 2301, the lock bar 230 is positioned at the most forward descending position in the pivot range determined by the insertion pin 233a and the restriction hole 212. Furthermore, the lock lower part 232 of the lock bar 230 contacts the concave part 133a (see FIG. 3A) of the main frame 100.

During this, the contact surface 232a of the lock bar 230 contacts the main frame-side pin 131 (more specifically, the concave part 131a illustrated in FIG. 3A). The contact surface 232a contacts the main frame-side pin 131, thereby restricting backward movement of the main frame 100 (main frame-side pin 131). In this way, the lock bar 230 being positioned at the most forward descending position illustrated in FIG. 11 (restriction position) prevents the main frame-side pin 131 from detaching from the hook part 221 of the guide 220.

Furthermore, the detent 240 is biased by the torsion coil spring 2401 so as to rotate in the clockwise direction as viewed from the left side around the axis of the pivot shaft 241a. However, rotation of the detent 240 is restricted by the notch part 241b in contact with the outer peripheral surface of the lock center part 231, and the detent 240 is held at the position (unholding or non-holding position) illustrated in FIG. 11.

During this, since the notch part 241b is formed in an arc shape concentric with the outer peripheral surface of the lock center part 231 in a side view, the detent 240 does not hinder pivoting of the lock bar 230.

Figure 12:
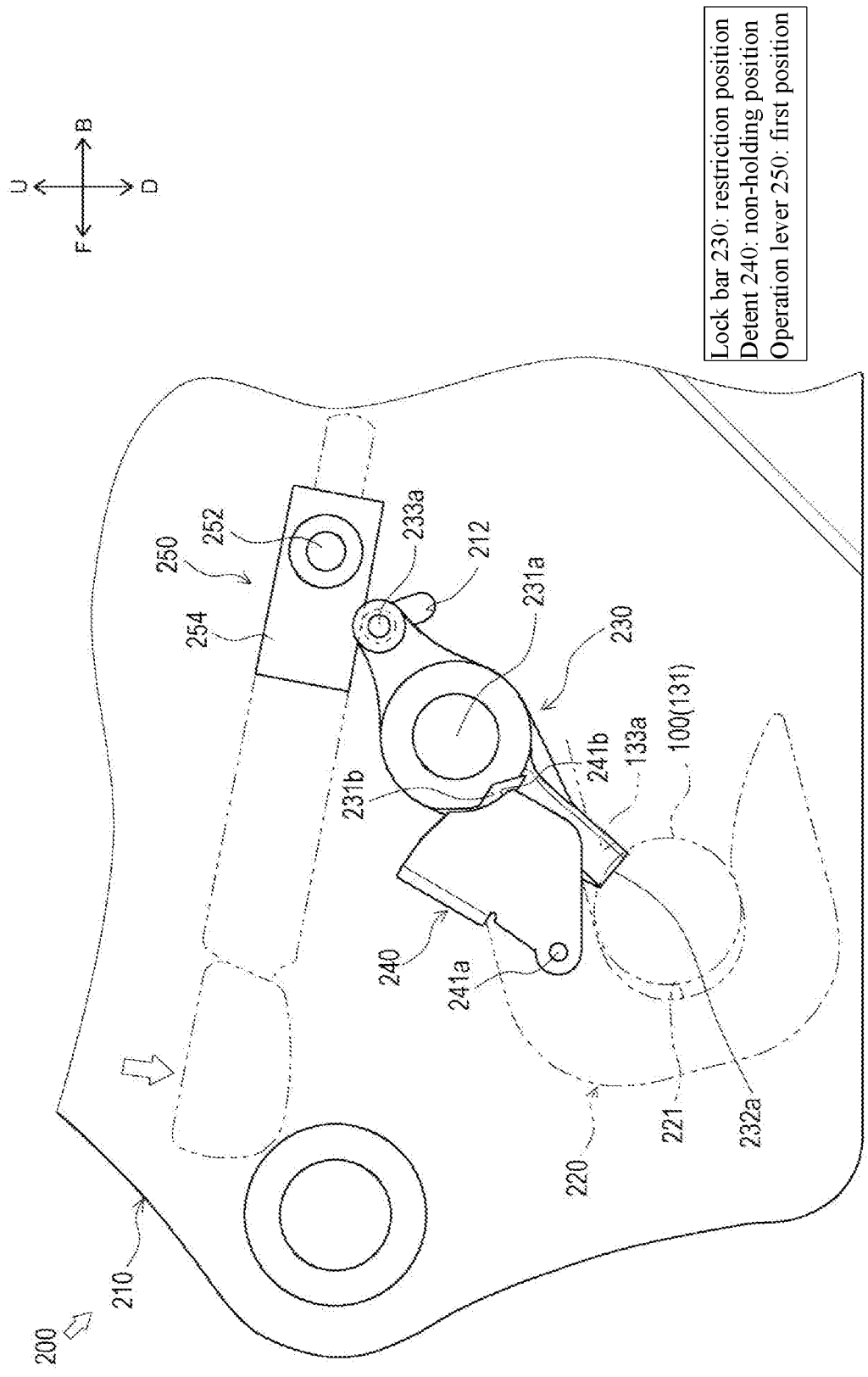
FIG. 12 is a left-right view illustrating a state wherein an operation lever is in contact with a lock bar while removing the subframe unit according to one or more embodiments.

As illustrated in FIG. 12, an operator presses the grip part 251 of the operation lever 250 downward. Then, the operation lever 250 rotates counterclockwise (forward descending direction) as viewed from the left side around the axis of the pivot shaft 252 against the biasing force (a third biasing force) of the torsion coil spring 2501. Accordingly, the action part 254 of the operation lever 250 rotates to a position (first position) in contact with the insertion pin 233a (more specifically, a collar provided on the insertion pin 233a) of the lock bar 230.

Figure 13:
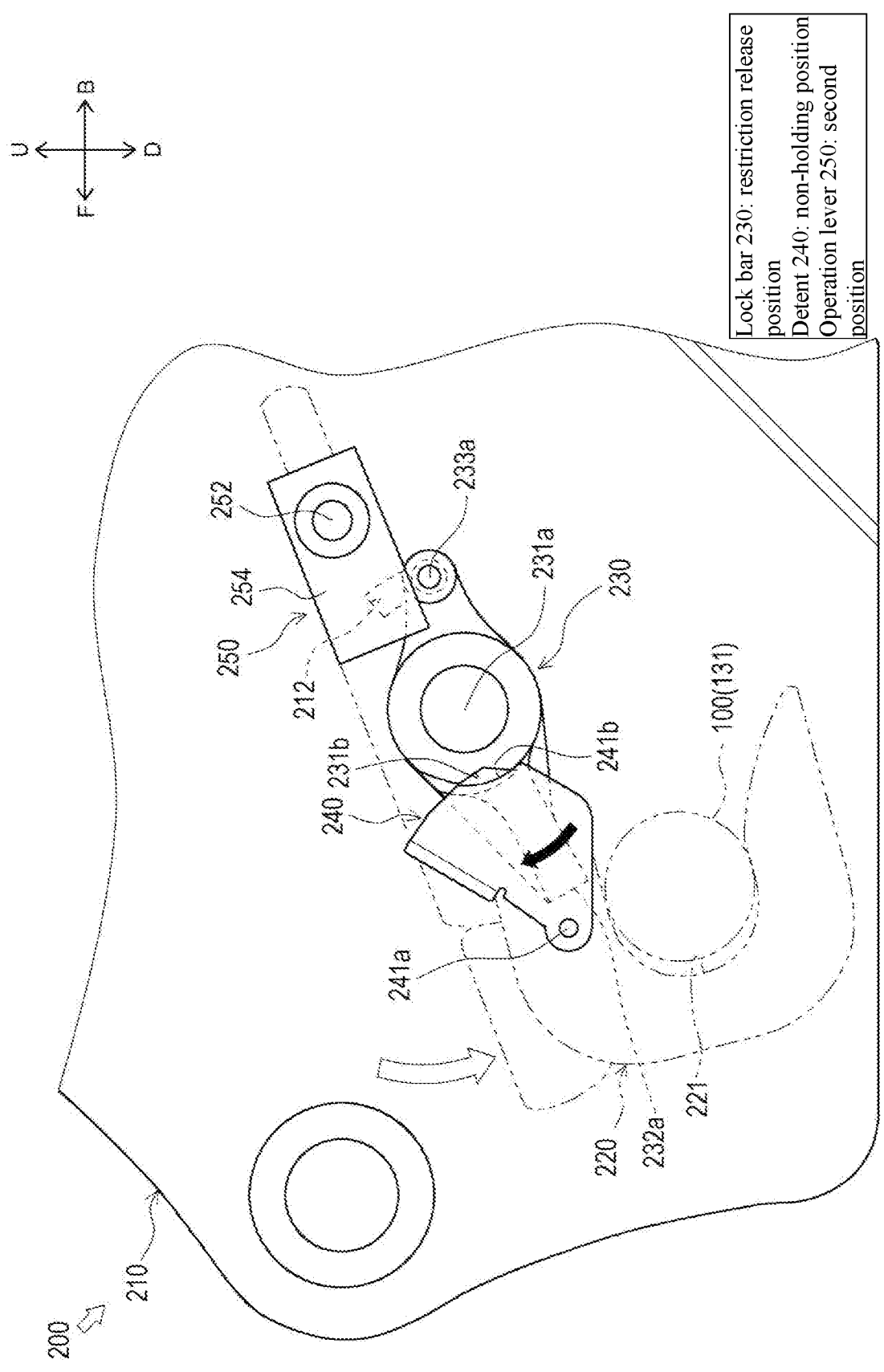
FIG. 13 is a left-side view illustrating a state wherein a lock bar has pivoted to a restriction release position while removing the subframe unit according to one or more embodiments.

As illustrated in FIG. 13, the operation lever 250 is further rotated in a forward descending direction against the biasing force and is rotated to the most forward descending position (second position). Accordingly, the insertion pin 233a is pressed downward by the action part 254. Then, the insertion pin 233a is pushed downward along the restriction hole 212, and the lock bar 230 rotates clockwise as viewed from the left side around the axis of the pivot shaft 231a against the biasing force. The lock bar 230 that has received the force from the operation lever 250 in this way rotates to the most forward ascending position (restriction release position) in the pivot range determined by the insertion pin 233a and the restriction hole 212.

When the lock bar 230 is rotated in this way to the most forward ascending position illustrated in FIG. 13, the contact surface 232a does make contact the main frame-side pin 131 (concave part 131a). Backward movement of the main frame 100 (main frame-side pin 131) is thereby made possible. In this way, the lock bar 230 being positioned at the most forward ascending position illustrated in FIG. 13 (restriction release position) releases the restriction on movement of the main frame 100 (main frame-side pin 131).

When the lock bar 230 is rotated to the restriction release position illustrated in FIG. 13, the notch part 241b of the detent 240 does not contact the outer periphery surface of the lock center part 231. Accordingly, the detent 240 is rotatable in the clockwise direction (backward descending direction) when viewed from the left side.

Figure 14:
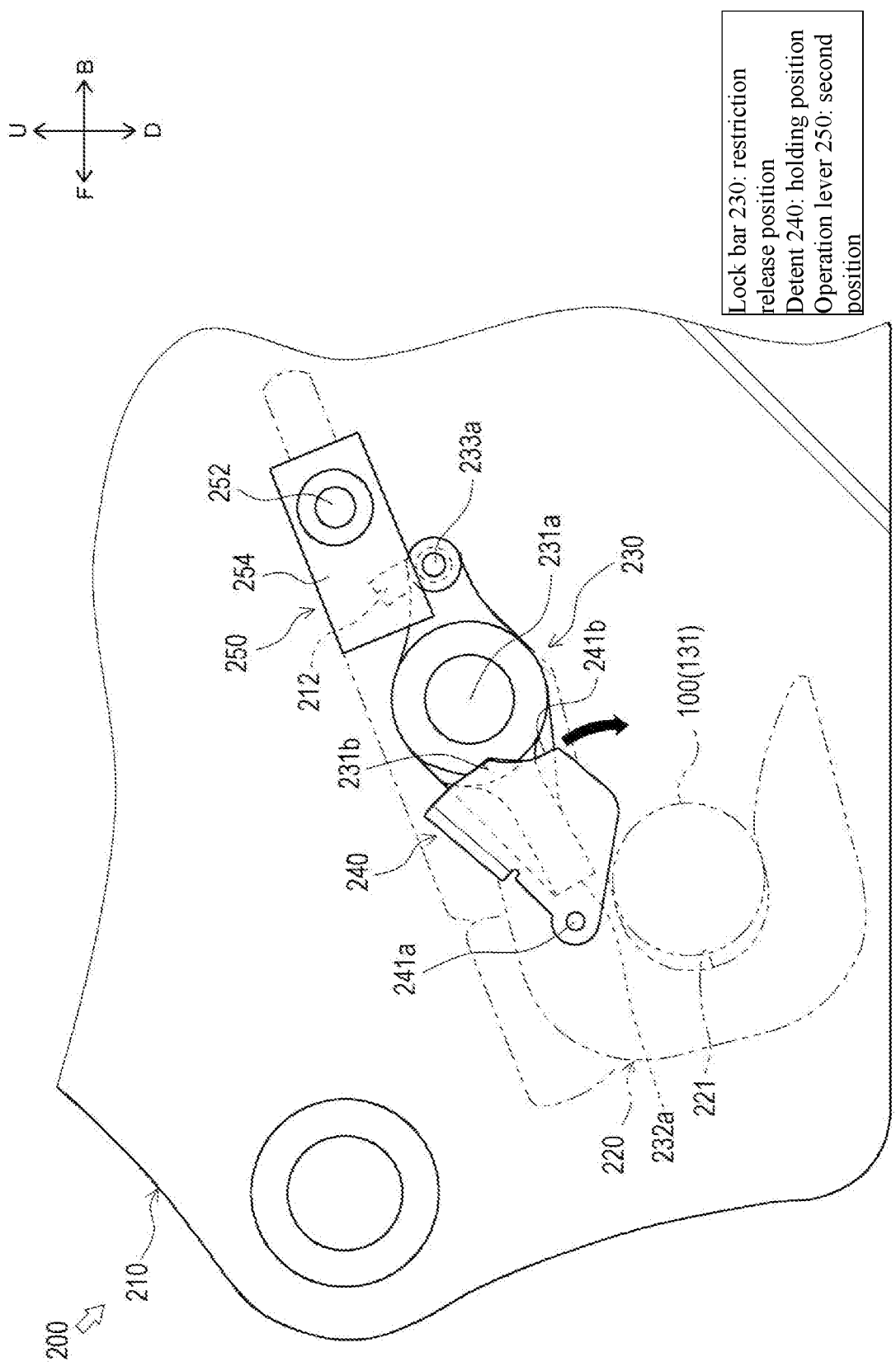
FIG. 14 is a left-side view illustrating a state wherein the lock bar is held by the detent at the restriction release position while removing the subframe unit according to one or more embodiments.

As illustrated in FIG. 14, biasing force from the torsion coil spring 2401 rotates the rotatable detent 240 in the clockwise direction (backward descending direction) when viewed from the left side. Then, the notch part 241b of the detent 240 engages with the concave part 231*b* of the lock bar 230. The notch part 241*b* engages with the concave part 231*b*, thereby restricting rotation in the counterclockwise direction when viewed from the left side of the lock bar 230. Rotation of the detent 240 in the clockwise direction when viewed from the left side is restricted at the same time as this. In this way, the detent 240 is positioned at the position illustrated in FIG. 14 (holding position), thereby holding the lock bar 230 at the restriction release position.

Figure 15:
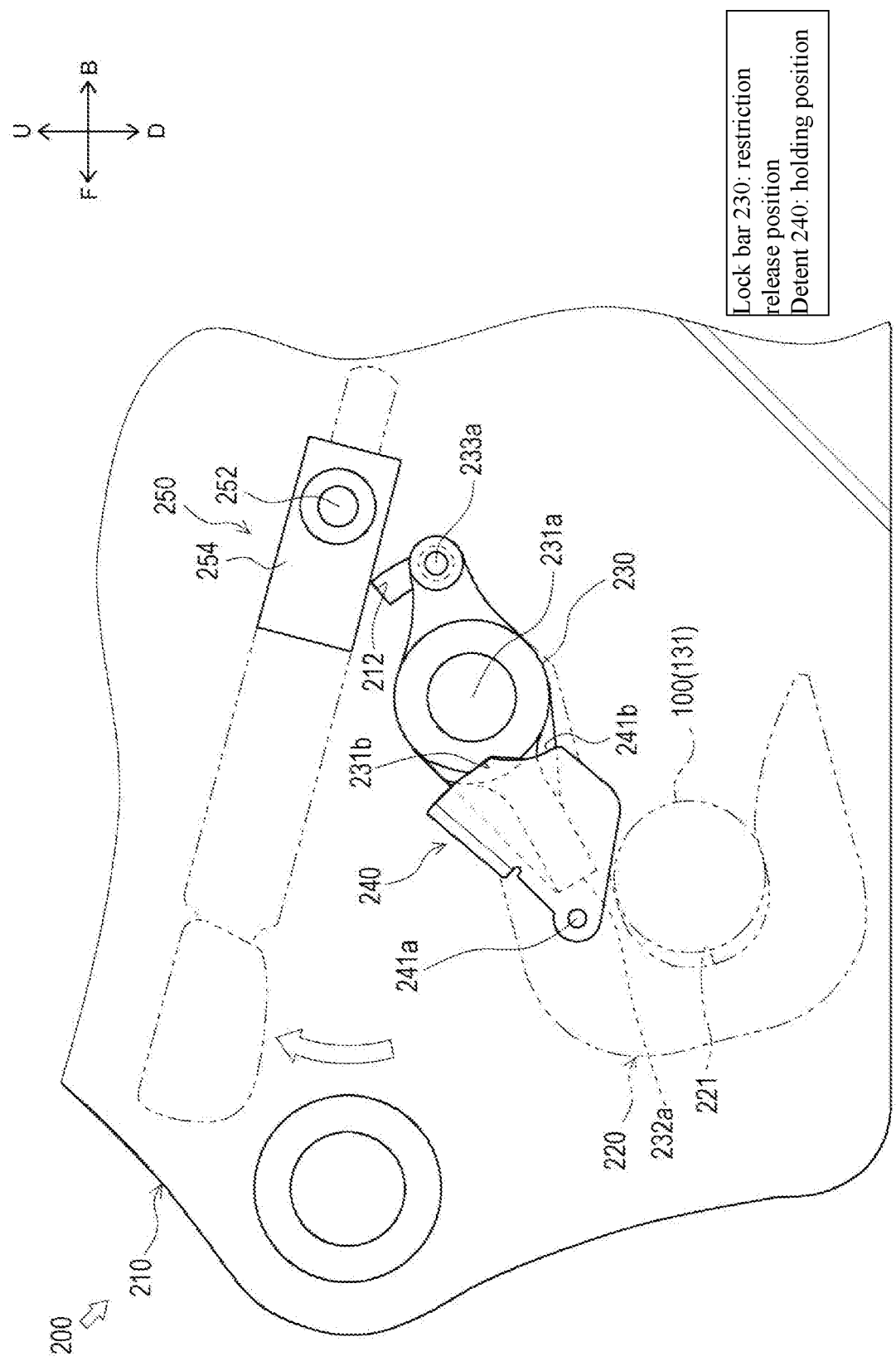
FIG. 15 is a left-side view illustrating a state wherein the operation lever is returned to its original position while removing the subframe unit according to one or more embodiments.

As illustrated in FIG. 15, when the operator releases their hand from the grip part 251 of the operation lever 250, the operation lever 250 rotates in the clockwise direction when viewed from the left side by the biasing force of the torsion coil spring 250l and returns to the original position (position illustrated in FIG. 11).

Figure 16:
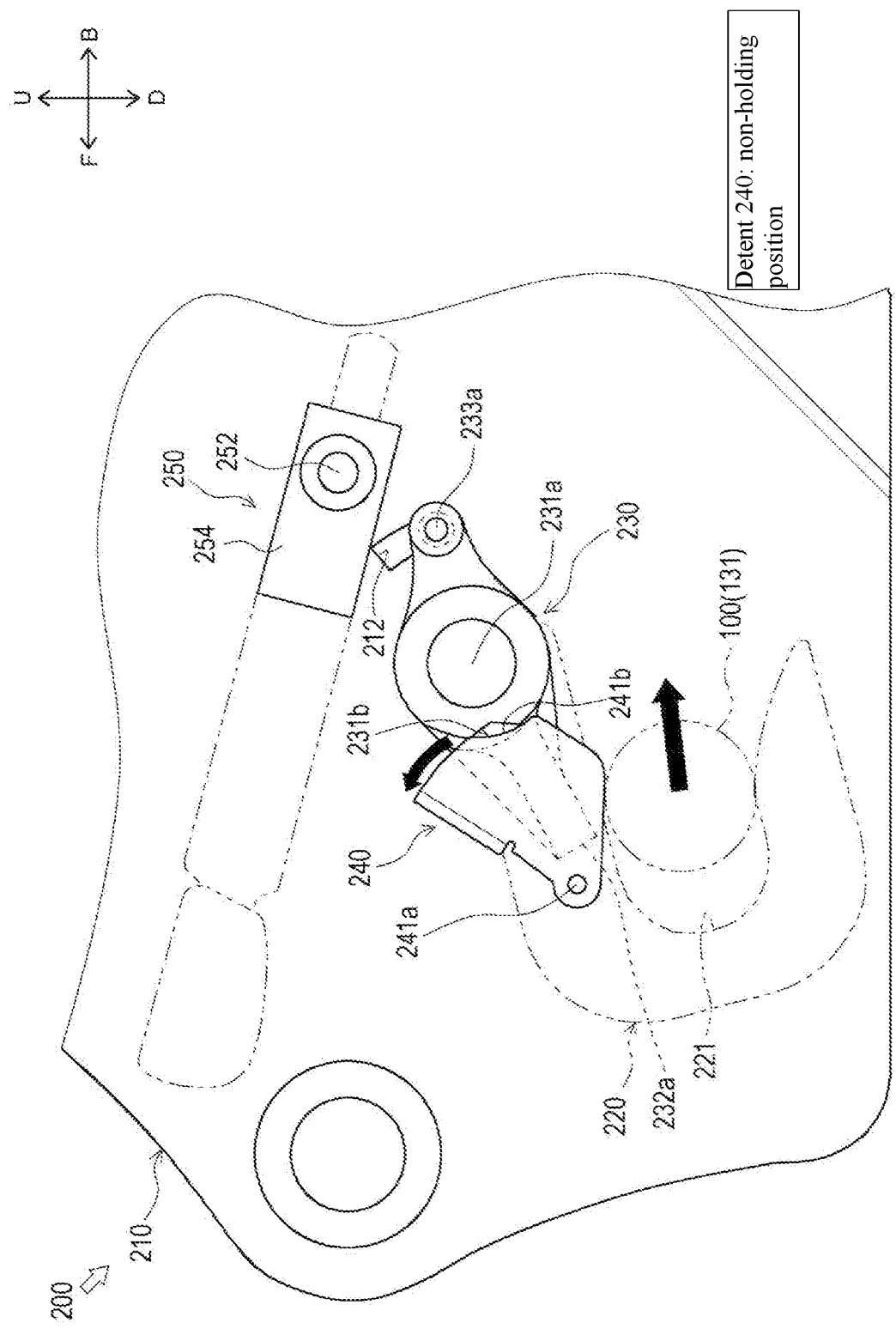
FIG. 16 is a left-side view illustrating a state wherein holding of the lock bar by a detent is released while removing the subframe unit according to one or more embodiments.

As illustrated in FIG. 16, the vehicle body 1 is moved backward in a state wherein the lock bar 230 is held at the restriction release position by the detent 240. Then, the main frame 100 (main frame-side pin 131) is guided by the hook part 221 to move backward. The main frame 100 (main frame-side pin 131) pushes the detent 240 upward while it moves backward. The detent 240 is pushed by the main frame-side pin 131 to rotate in the counterclockwise direction when viewed from the side against the biasing force, and moves to the non-holding position. Then, the engagement between the notch part 241*b* of the detent 240 and the concave part 231*b* of the lock bar 230 is released. The hold on the lock bar 230 by the detent 240 is thereby released.

Figure 17:
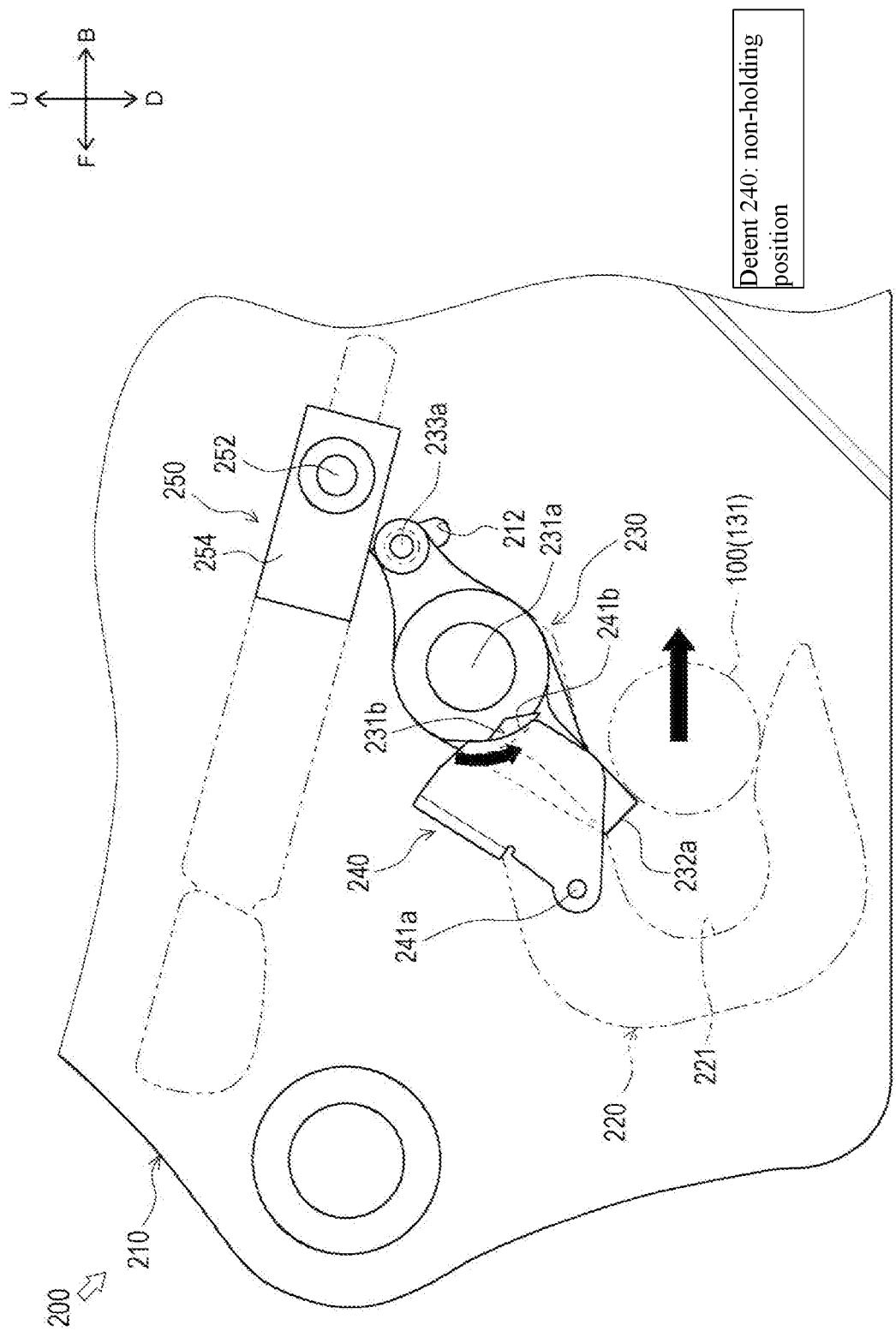
FIG. 17 is a left-side view illustrating a state wherein the lock bar has begun to pivot to the restriction position while removing the subframe unit according to one or more embodiments.

As illustrated in FIG. 17, when the hold on the lock bar 230 by the detent 240 is released, the lock bar 230 starts to rotate counterclockwise (forward descending direction) as viewed from the left side by the biasing force as the vehicle body 1 moves backward.

Figure 18:
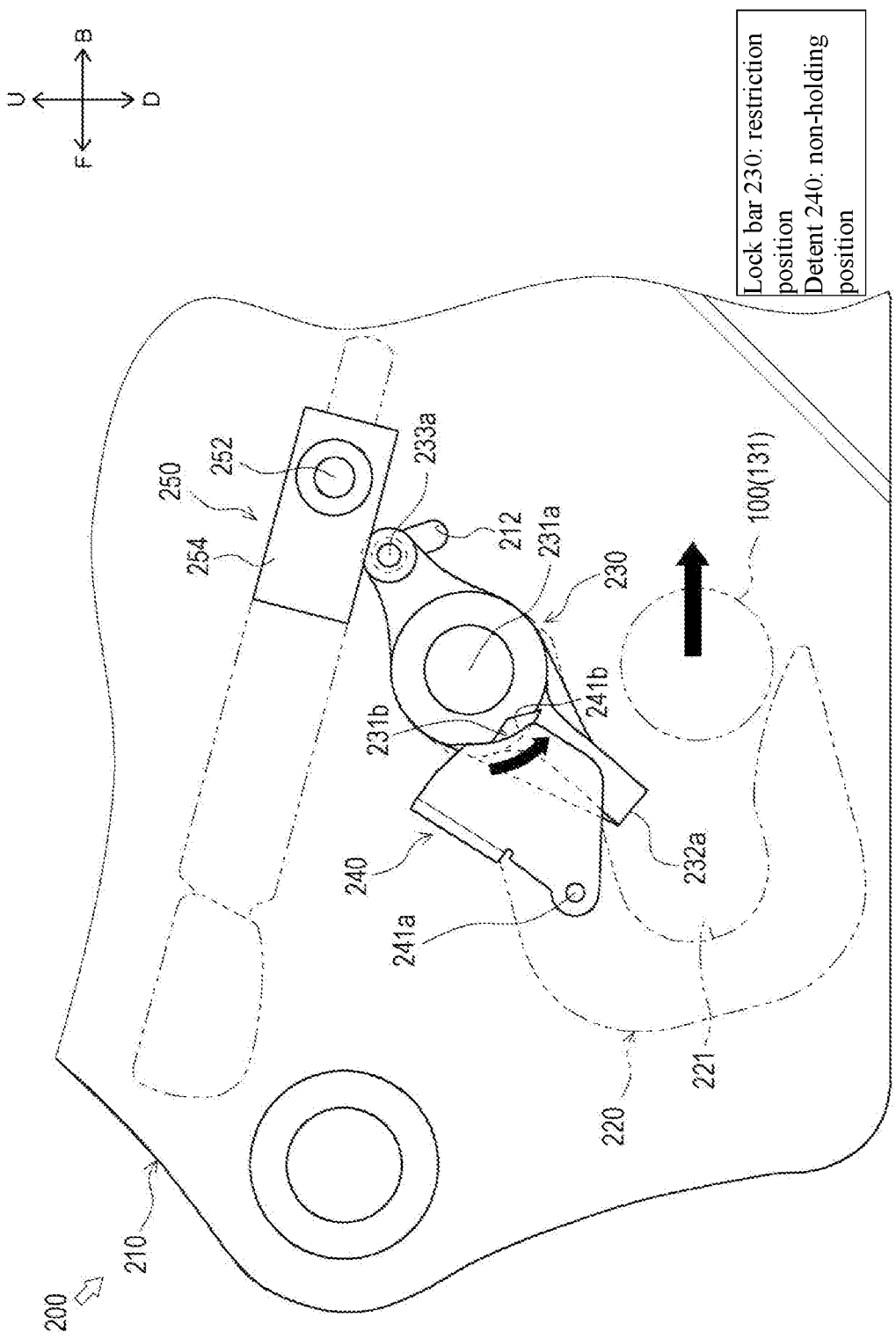
FIG. 18 is a left-side view illustrating a state wherein the subframe unit has been removed according to one or more embodiments.

As illustrated in FIG. 18, when the vehicle body 1 moves further backward, the lock bar 230 is further rotated counterclockwise (forward descending direction) as viewed from the left side by the biasing force, and rotates to the most forward descending position (restriction position) in the pivot range determined by the insertion pin 233*a* and the restriction hole 212. In this way, the lock bar 230 returns to the same position as the mounted state illustrated in FIG. 11 (restriction position). The detent 240 also returns to the same position as the mounted state illustrated in FIG. 11 (non-holding position).

In this manner, the front loader 20 (parts of the front loader 20 excluding the main frame 100) can be removed from the vehicle body 1.

In this manner, in one or more embodiments, a lock by the lock bar 230 (restriction on backward movement of the main frame 100) can be released (see FIG. 13), and the lock bar 230 can be held at the restriction release position by the detent 240 (see FIG. 14), simply by operating the operation lever 250. Therefore, the front loader 20 (subframe unit 200) can be removed from the vehicle body 1 by simply operating the operation lever 250 to move the vehicle body 1 backward. In this way, the task of removing the front loader 20 can be simplified.

Furthermore, when the detent 240 is holding the lock bar 230 at the restriction release position and the main frame-side pin 131 moves relatively in a direction separated from the guide 220, the detent 240 is lifted up by the main frame-side pin 131, separating from the concave part 231*b* of the lock bar 230 and releasing the hold on the lock bar 230 (see FIG. 16). In this way, since the hold on the lock bar 230 by the detent 240 is automatically released by simply moving the vehicle body 1 backward, it is not necessary to perform a task to release this hold. Thus, it is possible to reduce the burden of attaching and detaching the front loader 20.

Furthermore, in the mounted state illustrated in FIG. 11, rotation of the detent 240 is restricted when in contact with the lock bar 230. Additionally, as illustrated in FIG. 15, rotation of the lock bar 230 from the restriction release position is restricted by the detent 240. In this way, the lock bar 230 and the detent 240 are formed so as to have a relationship of mutually restricting the rotation thereof. Thus, there is no need to separately prepare a member for holding the lock bar 230 and the detent 240, and the number of components can be reduced.

Furthermore, since the hook part 221 is formed so that its opening is oriented backward, the operator in the cabin 10 can easily confirm a state of attachment or detachment of the subframe unit 200.

Moreover, after the operation lever 250 is moved to the second position (see FIG. 14) contacting the insertion pin 233*a* of the lock bar 230 at the restriction release position, it automatically returns to the first position (see FIG. 12) contacting the insertion pin 233*a* of the lock bar 230 at the restriction position and further returns to the original position (see FIG. 11). Therefore, the operation of moving the operation lever 250 to the first position (see FIG. 12) or the original position (see FIG. 11) can be omitted. Furthermore, since the operation lever 250 is not necessarily connected to the lock bar 230 and simply makes contact therewith, it is possible to make sure that there is no effect on pivoting of the lock bar 230, even if the operation lever 250 returns to the original position (see FIG. 11).

Moreover, providing the indicator 260 makes it possible for the operator to easily grasp whether the lock bar 230 is at either the restriction position or the restriction release position. This will be described in detail below.

When the insertion pin 233*a* is positioned at the upper end part of the restriction hole 212, the lock bar 230 is positioned at the restriction position (see FIG. 11 or the like). When the insertion pin 233*a* is positioned at the lower end part of the restriction hole 212, the lock bar 230 is positioned at the restriction release position (see FIG. 14 or the like). When the protrusion part of the insertion pin 233*a* (see FIG. 10B) is positioned relatively upward, that is, when it is positioned close to "ON" displayed on the display part 261 of the indicator 260, the operator is able to know that the lock bar 230 is at the restriction position. Furthermore, when the protrusion part of the insertion pin 233*a* is positioned relatively downward, that is, when it is positioned close to "OFF" displayed on the display part 261 of the indicator 260, the operator is able to know that the lock bar 230 is at the restriction release position. In this way, the operator is able to know the state (position) of the lock bar 230 according to the insertion pin 233*a* and indicator 260. Thus, when removing the front loader 20, after confirming that the restriction on backward movement of the main frame 100 has been released by the lock bar 230, the vehicle body 1 can be moved backward.

Next, the method of mounting the front loader 20 (more specifically, parts of the front loader 20 excluding the main frame 100) to the vehicle body 1 will be described using FIGS. 19 to 21.

Note that as described above, the position (topology) of the lock bar 230 and the detent 240 is the same as the position in the mounted state illustrated in FIG. 11.

Figure 19:
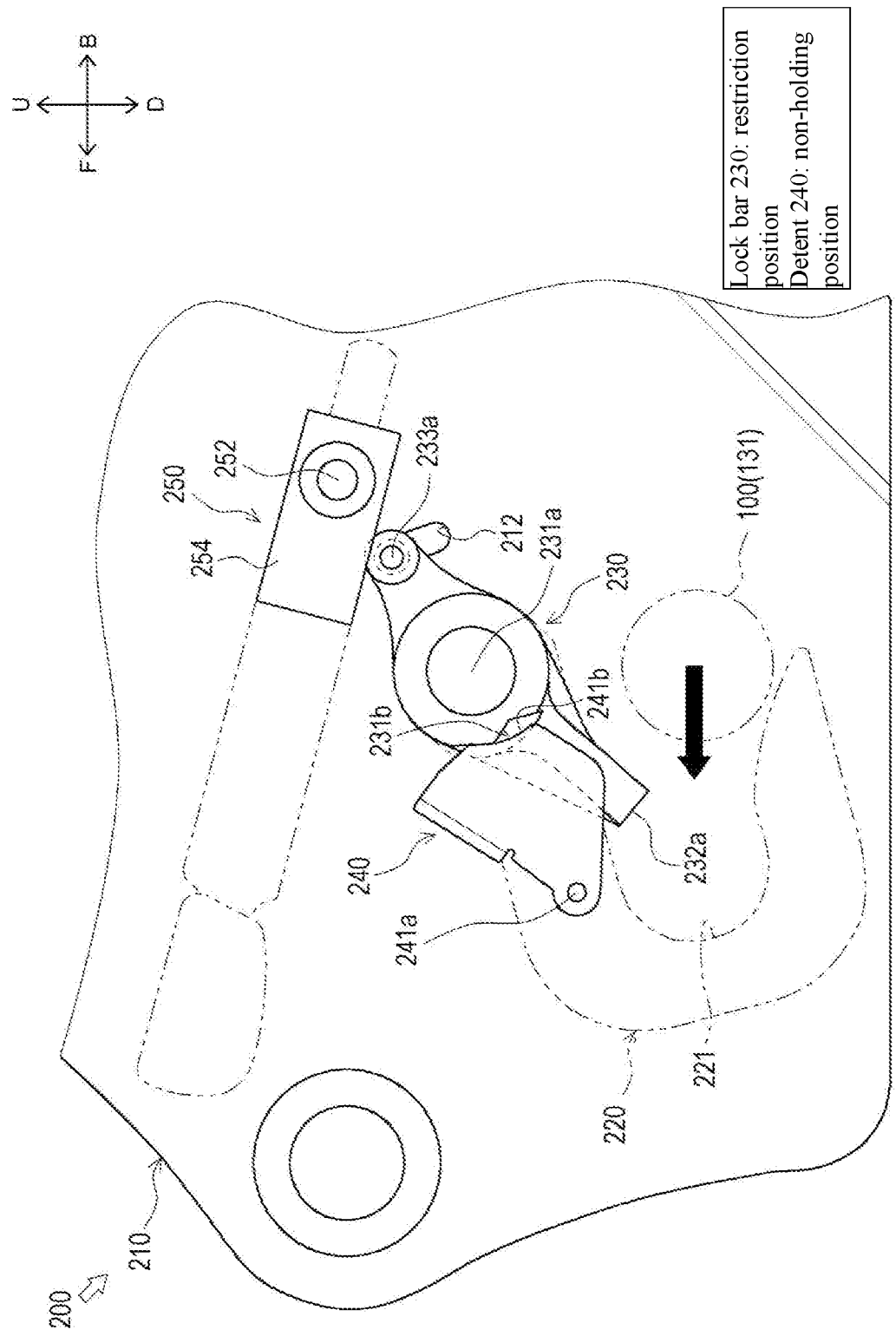
FIG. 19 is a left-side view illustrating a state wherein a vehicle body has begun to move forward while the subframe unit is being mounted according to one or more embodiments.

As illustrated in FIG. 19, the vehicle body 1 is moved forward, and the main frame-side pin 131 is brought close to the guide 220.

Figure 20:
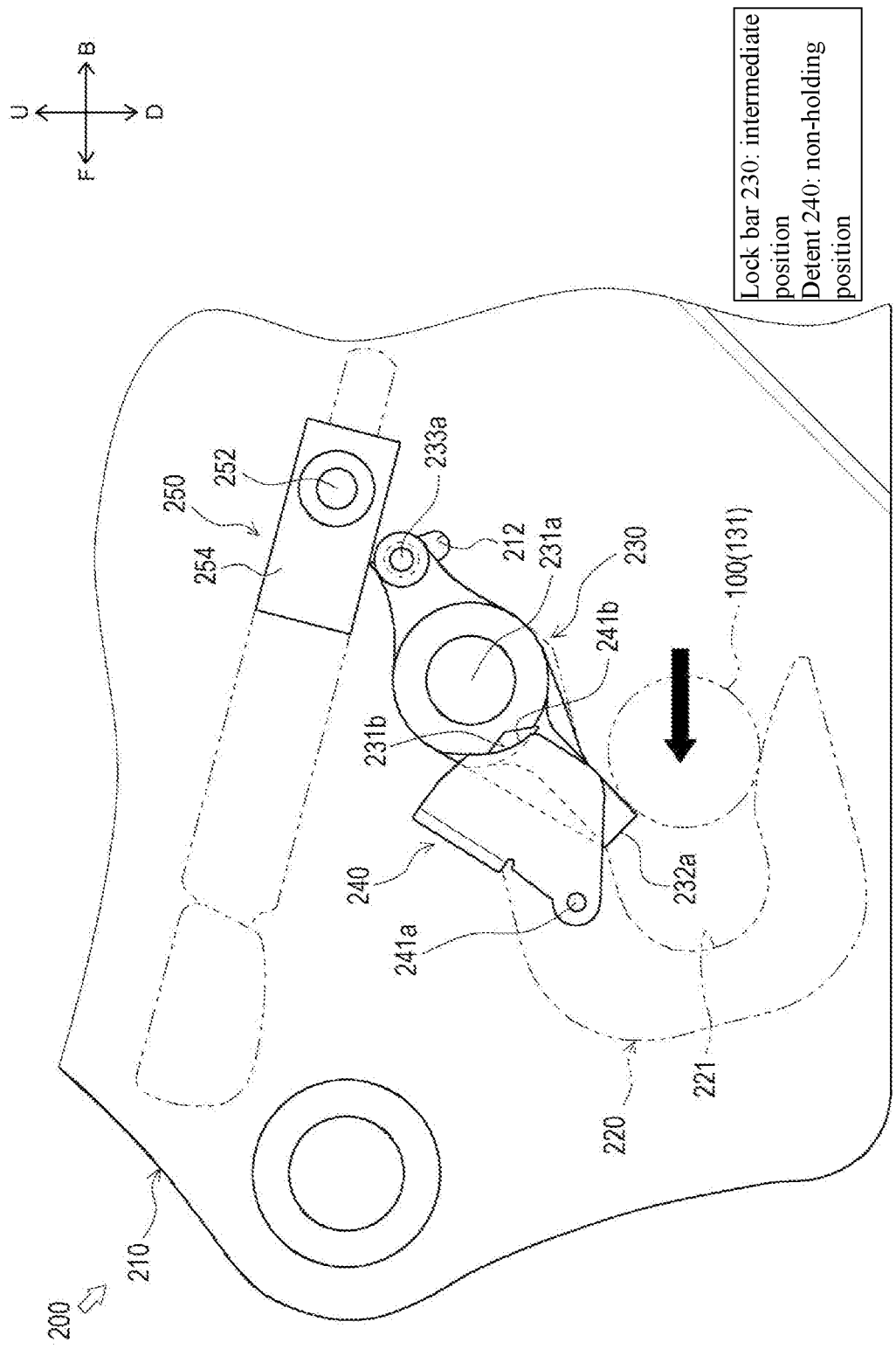
FIG. 20 is a left-side view illustrating a state wherein the main frame has entered the guide while the subframe unit is being mounted according to one or more embodiments.

As illustrated in FIG. 20, the vehicle body 1 is moved further forward, and the main frame-side pin 131 contacts the lock bar 230. When the vehicle body 1 is moved further forward, the main frame 100 (main frame-side pin 131) moves forward while the lock bar 230 is raised upward. The lock bar 230 is pressed by the main frame-side pin 131 to rotate in the clockwise direction (forward ascending direction) as viewed from the left side against biasing force. The lock bar 230 is thereby moved to an intermediate position (see FIG. 20) between the restriction position (see FIGS. 11, 19, and the like) and the restriction release position (see FIGS. 13, 14, and the like).

Figure 21:
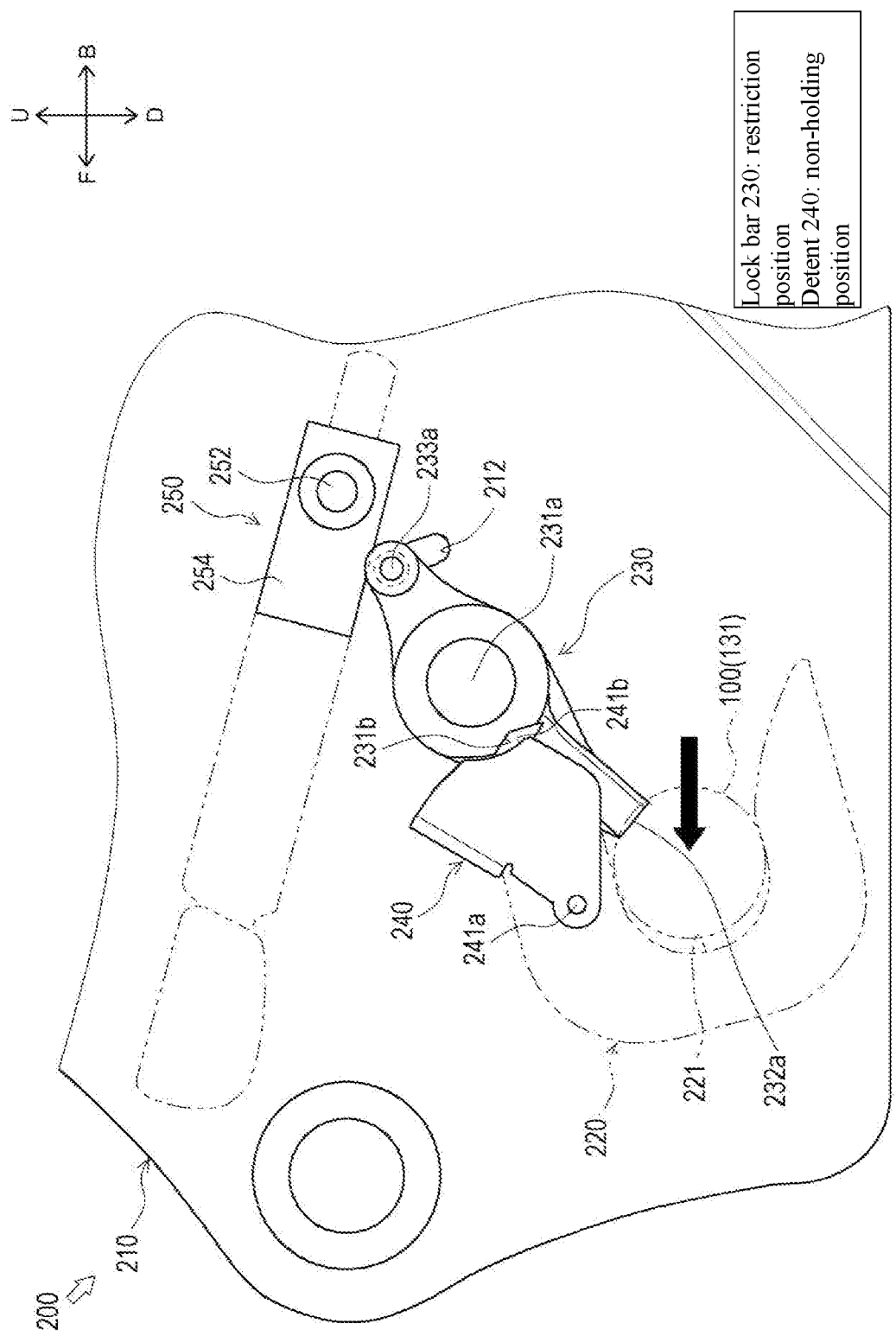
FIG. 21 is a left-side view illustrating a state wherein the subframe unit has been mounted according to one or more embodiments.

As illustrated in FIG. 21, when the vehicle body 1 is moved further forward, the main frame-side pin 131 engages with the hook part 221 and is held by the hook part 221. During this, the lock bar 230 does not rotate to the restriction release position (see FIGS. 13, 14, and the like), and biasing force returns it to the original restriction position (see FIG. 19). The lock bar 230 thereby restricts backward movement of the main frame 100 engaged with (held by) the guide 220. During this, the contact surface 134 of the main frame 100 contacts the target contact surface 222a of the guide 220.

In this manner, the front loader 20 (parts of the front loader 20 excluding the main frame 100) can be mounted to the vehicle body 1.

In this way, in one or more embodiments, the subframe 200 can be automatically mounted to the main frame 100 by simply moving the vehicle body 1.

Furthermore, as described above, the position (topology) of the lock bar 230 and the detent 240 after the subframe unit 200 has been removed from the main frame 100 automatically returns to the position in the mounted state illustrated in FIG. 11 (see FIG. 18). However, even if, for example, the lock bar 230 is pushed up by accidentally touching the operation lever 250 (at the restriction release position), the subframe unit 200 can be mounted to the main frame 100. This will be described in detail below.

Figure 22:
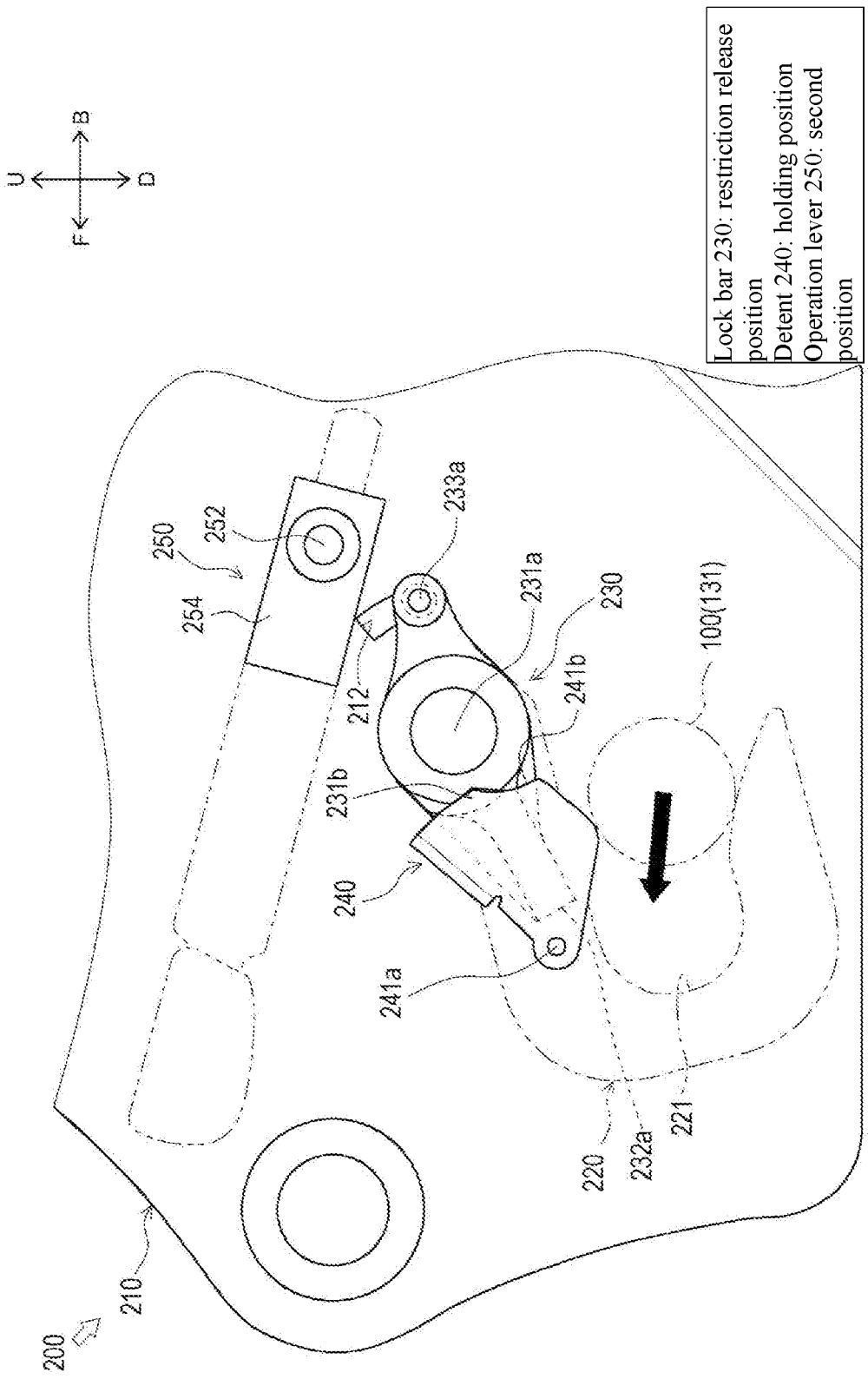
FIG. 22 is a left-side view illustrating a state wherein the detent has been brought into contact by the main frame while the subframe unit is being mounted in a state wherein the lock bar has been uplifted according to one or more embodiments.

As illustrated in FIG. 22, when the lock bar 230 is at the restriction release position and the vehicle body 1 is moved further forward, the main frame-side pin 131 contacts the detent 240.

Figure 23:
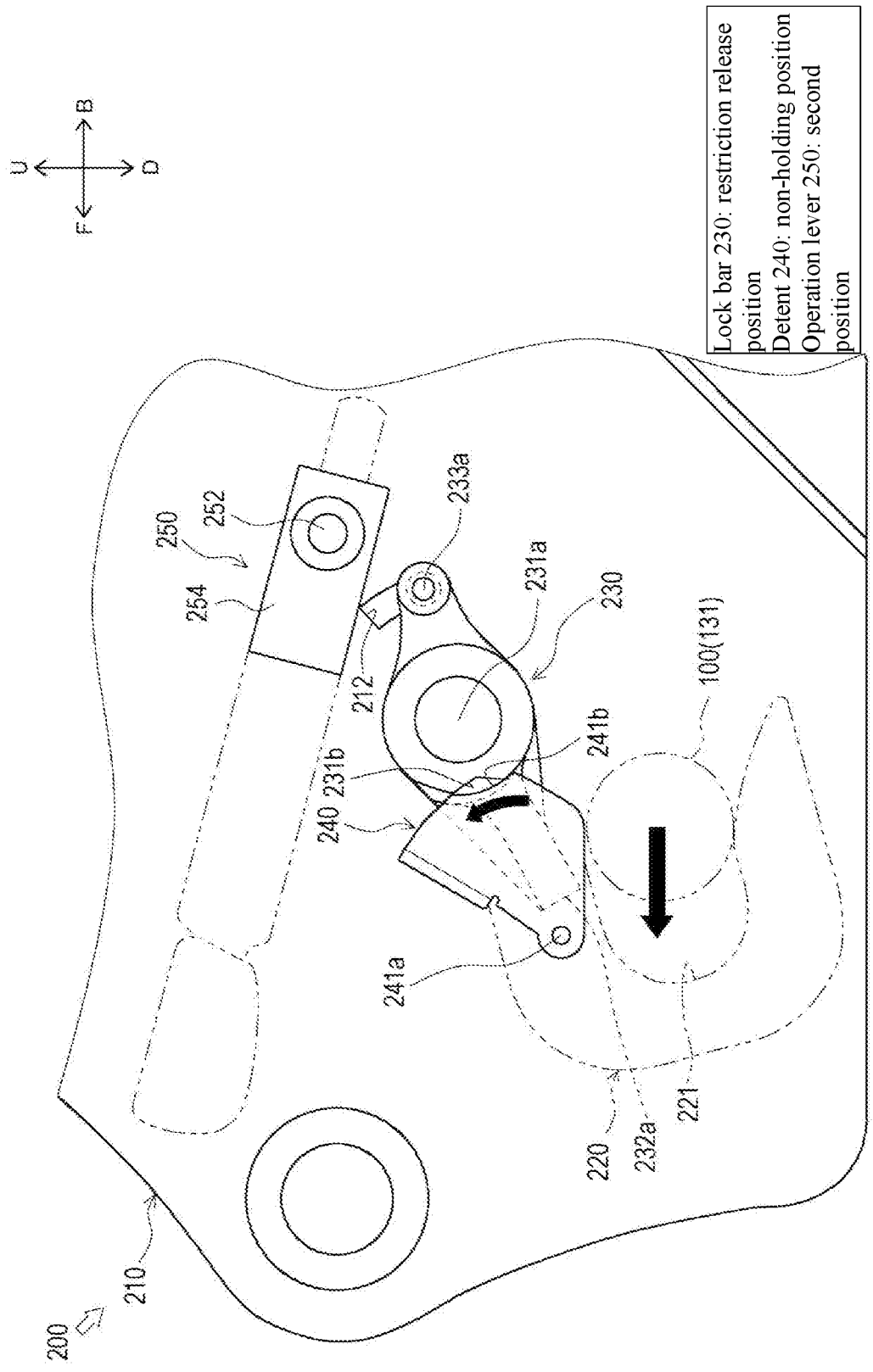
FIG. 23 is a left-side view illustrating a state wherein the detent has been uplifted by the main frame while the subframe unit is being mounted in a state wherein the lock bar has been uplifted according to one or more embodiments.

As illustrated in FIG. 23, when the vehicle body 1 is moved further forward, the main frame 100 (main frame-side pin 131) moves forward while the detent 240 is raised upward. The detent 240 is pressed by the main frame-side pin 131 to rotate in the clockwise direction (backward ascending direction) as viewed from the left side against biasing force. The detent 240 is thereby moved from the holding position to the non-holding position. Then, the engagement between the notch part 241b of the detent 240 and the concave part 231b of the lock bar 230 is released. The hold on the lock bar 230 by the detent 240 is thereby released.

Figure 24:
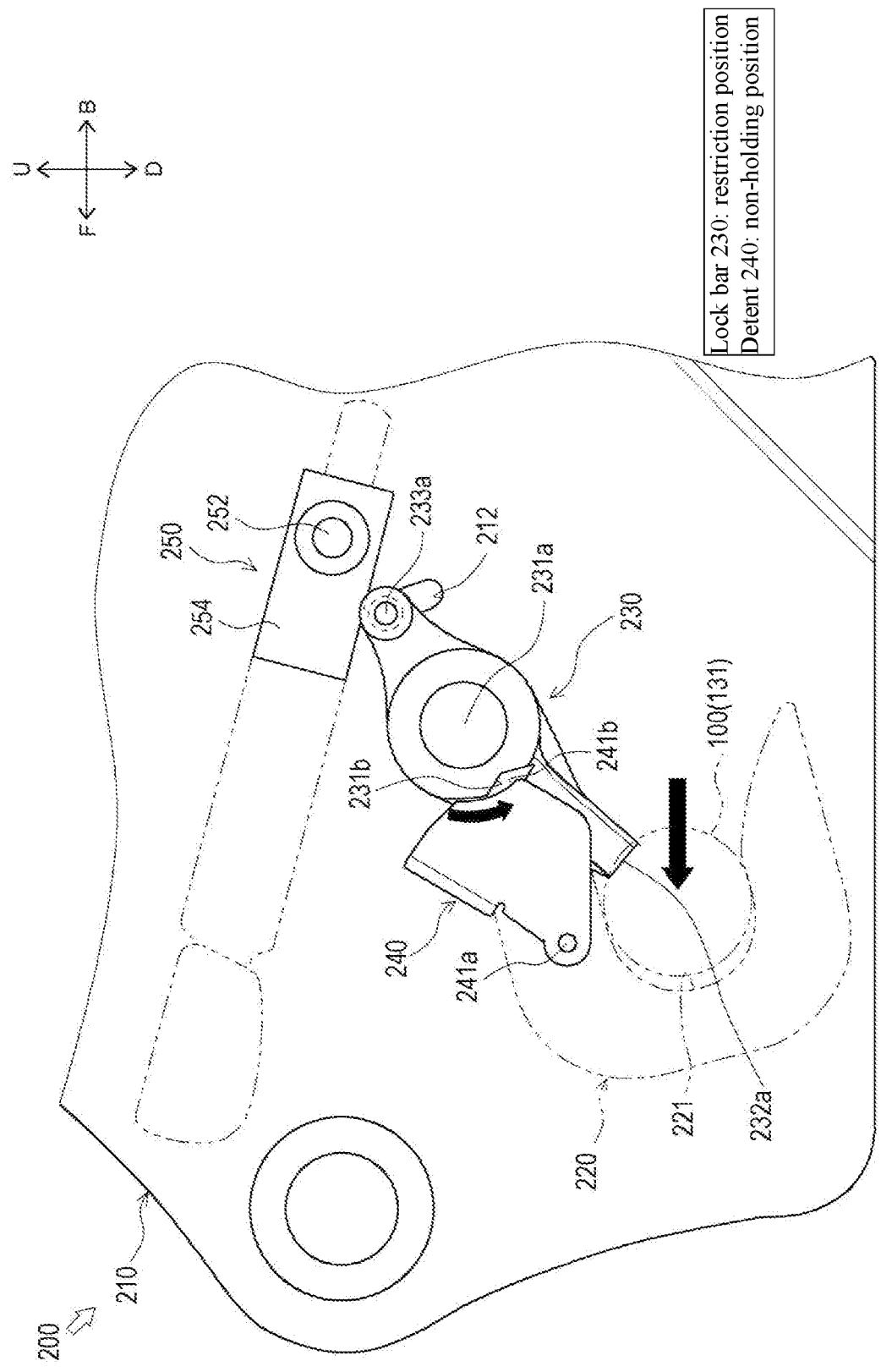
FIG. 24 is a left-side view illustrating a state wherein the subframe unit has been mounted according to one or more embodiments.

As illustrated in FIG. 24, when the hold on the lock bar 230 by the detent 240 is released, the lock bar 230 rotates counterclockwise (forward descending direction) as viewed from the left side by the biasing force and moves to the restriction position. The lock bar 230 thereby restricts backward movement of the main frame-side pin 131 engaged with the hook part 221.

In this manner, even if the lock bar 230 is lifted up (at the restriction release position) after the subframe unit 200 has been removed from the main frame 100, the front loader 20 (parts of the front loader 20 excluding the main frame 100) can be mounted to the vehicle body 1.

As above, the detachable structure of the front loader 20 according to one or more embodiments is provided with the guide 220 (engaging part) formed on a subframe 210 supporting the boom 300 so as to be engageable with the main frame 100 provided on a vehicle body 1; the lock bar 230 (restriction member) provided with the pivot shaft 231a provided on the subframe 210, the lock bar 230 pivotably supported around the pivot shaft 231a between the restriction position for restricting movement of the main frame 100 engaged with the guide 220 and the restriction release position for allowing movement of the main frame 100 engaged with the guide 220 and biased in a restriction direction oriented to the restriction position from the restriction release position; the operation lever 250 (operation tool) operable so as to pivot the lock bar 230 from the restriction position to the restriction release position against biasing force; and the detent 240 movably supported by the subframe 210 between the holding position for holding the lock bar 230 at the restriction release position and the non-holding position for releasing a hold on the lock bar 230 at the restriction release position and biased in the holding direction oriented to the holding position from the non-holding position; wherein the detent 240 moves to the holding position by biasing force when the operation lever 250 moves the lock bar 230 to the restriction release position, engages with the concave part 231b provided at the lock center part 231 (pivot shaft part) through which the pivot shaft 231a is inserted, and holds the lock bar 230 at the restriction release position.

By configuring in this way, the front loader 20 is easily attached to and detached from a vehicle body 1. Specifically, the lock bar 230 can be held at the restriction release position by the detent 240 by simply operating the operation lever 250. Therefore, the subframe unit 200 can be easily detached from the main frame 100.

Furthermore, the detent 240, during a state wherein the lock bar 230 is held at the holding position, moves to the non-holding position side against biasing force in accordance with the main frame 100 moving relative to a direction separated from the guide 220, and separates from the concave part 231b to release the hold on the lock bar 230.

By configuring in this way, since the hold on the lock bar 230 by the detent 240 is automatically released, it is not necessary to perform a task to release this hold. Thus, it is possible to reduce the burden of attaching and detaching the front loader 20.

Furthermore, the detent 240, in the non-holding position, comes into contact with the lock bar 230 at the restriction position, whereby movement to the holding position is restricted.

By configuring in this way, there is no need to separately prepare a member for holding the detent 240 at the non-holding position; therefore, the number of components can be reduced.

Furthermore, the guide 220 is provided with the hook part 221 for restricting movement of the main frame 100 in the vertical direction by interposing the main frame-side pin 131 (pin) formed on the main frame 100 from the vertical direction; and the target contact surface 222a for restricting forward movement of the main frame 100 by making surface contact the main frame 100; wherein an opening or open part of the hook part 221 is oriented backward in a vehicle forward and backward direction.

By configuring in this way, the main frame 100 can be firmly held at the guide 220. Furthermore, since the open part of the hook part 221 is oriented backward, confirmation by the operator is easy.

Moreover, the lock bar 230 is provided with the contact surface 232a (contact part) for restricting movement of the main frame 100 by making contact the main frame 100; and the insertion pin 233a (action part) for receiving force from the operation lever 250; and the lock center part 231 is formed between the contact surface 232a and the insertion pin 233a.

By configuring in this way, the lock bar 230 can be moved to the restriction release position by a simple configuration.

Furthermore, the operation lever 250 is movably supported by the subframe 210 between the first position in contact with the insertion pin 233a of the lock bar 230 at the restriction position and the second position in contact with the insertion pin 233a of the lock bar 230 at the restriction release position and biased in a direction oriented to the first position from the second position; and the operation lever 250 is formed so as to operate to move from the first position to the second position against biasing force to move the lock bar 230 from the restriction position to the restriction release position.

By configuring in this way, since the operation lever 250 automatically returns from the second position to the first position, the operation of moving the operation lever 250 to the first position when the lock bar 230 is moved to the restriction position can be omitted.

Furthermore, the lock bar 230 moves at the restriction position to an intermediate position between the restriction position and the restriction release position against biasing force when the main frame 100 moves relative to a direction approaching the guide 220; and when the main frame 100 is engaged with the guide 220, the lock bar 230 is moved to the restriction position by biasing force and restricts movement of the main frame 100 engaged with the guide 220.

By configuring in this way, the subframe unit 200 can be automatically mounted to the main frame 100 by simply moving the vehicle body 1.

Furthermore, the front loader 20 is provided with the detachable structure according to one or more embodiments.

By configuring in this way, it is possible to provide the front loader 20 that is easily attached to and detached from the vehicle body 1.

Furthermore, the tractor (work vehicle) according to one or more embodiments is provided with the front loader 20.

By configuring in this way, it is possible to provide a tractor work vehicle wherein the front loader 20 is easily attached to and detached from the vehicle body 1.

Note that the tractor is the work vehicle according to one or more embodiments of the present invention.

Furthermore, the guide 220 is the engaging part according to one or more embodiments of the present invention.

Moreover, the target contact surface 222a is the contact surface according to one or more embodiments of the present invention.

Furthermore, the lock bar 230 is the restriction member according to one or more embodiments of the present invention.

Moreover, the lock center part 231 is the pivot shaft part according to one or more embodiments of the present invention.

Furthermore, the contact surface 232a is the contact part according to one or more embodiments of the present invention.

Moreover, the insertion pin 233a is the action part according to one or more embodiments of the present invention.

Furthermore, the detent 240 is the engaging or holding member according to one or more embodiments of the present invention.

Moreover, the operation lever 250 is the operation tool according to one or more embodiments of the present invention.

One or more embodiments of the present invention are described above; however, the present invention is not limited to the foregoing configuration, and various modifications are possible within the scope of the invention.

For example, in one or more embodiments, the lock bar 230 engages with the main frame-side pin 131 and releases this engagement by pivoting; however, the mode of movement of the lock bar 230 is not limited to pivoting. For example, it may also slide with respect to the subframe 210.

Furthermore, in one or more embodiments, the detent 240 restricts pivoting of the lock bar 230 and releases this restriction by pivoting; however, the mode of movement of the detent 240 is not limited to pivoting. For example, it may also slide with respect to the subframe 210.

Additionally, a member (bush) having an arbitrary shape (for example, a cylindrical shape or a C shape) may be exchangeably fitted to the main frame-side pin 131. Thus, even if a friction part (the member) of the guide 220 is cut off when the front loader 20 is attached or detached, a support frame 130 is able to maintain its original shape by exchanging the member (bush).

Furthermore, in one or more embodiments, on the back surface of the display part 261, "ON" is shown at the upper part and "OFF" is shown at the lower part. However, the display in the display part 261 may be any display, provided that the operator can grasp that the lock bar 230 is at the restriction position or the restriction release position. Moreover, the display in the display part 261 is not limited to a display using words. For example, the upper half and the lower half of the display part 261 may be color-coded.

Furthermore, the operation lever 250 may be formed so as to be locked to disable rotation, and to be rotatable by releasing the lock. Thus, two operations are required: a lock release operation and a rotation operation of the operation lever 250, and then it is possible to prevent the operation lever 250 from rotating unexpectedly.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF REFERENCE NUMERALS 1 vehicle body
20 front loader
100 main frame
131 main frame-side pin
210 subframe
220 guide
221 hook part (hook)
222a target contact surface
230 lock bar
231 lock center part
231a pivot shaft
231b concave part (cutout)
232a contact surface
233a insertion pin
240 detent (locking tool)
250 operation lever
300 boom

What is claimed is:

1. A structure of a detachable front loader for a vehicle body, the structure comprising:
a main frame disposed on the vehicle body;
a boom; and
a subframe unit that supports the boom, wherein
the subframe unit comprises:
a subframe;
a guide that is disposed on the subframe and engages with the main frame;
a lock bar that:
comprises:
a first pivot shaft disposed on the subframe; and
a pivot shaft part through which the first pivot shaft is inserted,
pivots around the first pivot shaft between a restriction position and a release position, wherein a movement of the main frame engaging with the guide is restricted by the lock bar at the restriction position and is released from the lock bar at the release position, and
is biased in a restriction direction oriented to the restriction position from the release position;
an operation tool that pivots the lock bar from the restriction position to the release position against a first biasing force; and
a locking tool that:
is supported by the subframe,
rotates around a second pivot shaft to move between a locking position and an unlocking position, wherein the locking tool at the locking position holds the lock bar at the release position, and the locking tool at the unlocking position releases the lock bar at the release position,
is biased in a locking direction oriented to the locking position from the unlocking position,
once the operation tool moves the lock bar to the release position, moves to the locking position by a second biasing force, engages with a cutout in the pivot shaft part, and holds the lock bar at the release position, and
has a recess part that contacts an outer peripheral surface of the lock bar and restricts the rotation of the locking tool without preventing the lock bar from rotating.

2. The structure of the detachable front loader according to claim 1, wherein
once the main frame moves in a direction away from the guide, the locking tool moves from the locking position toward the unlocking position against the second biasing force, and disengages from the cutout to release the lock bar.

3. The structure of the detachable front loader according to claim 1, wherein
once the locking tool at the unlocking position contacts the lock bar at the restriction position, the locking tool is restricted from moving to the locking position.

4. The structure of the detachable front loader according to claim 1, wherein
the guide comprises:
a hook that restricts the main frame from moving in a vertical direction; and
a contact surface that contacts the main frame and restricts the main frame from moving forward, wherein
an opening of the hook is oriented backward in a forward and backward direction, and
the hook interposes, from the vertical direction, a pin on the main frame.

5. The structure of the detachable front loader according to claim 1, wherein
the lock bar comprises:
a contact surface that contacts the main frame and restricts the main frame from moving; and
an insertion pin that receives a force from the operation tool; wherein
the pivot shaft part is disposed between the contact surface and the insertion pin.

6. The structure of the detachable front loader according to claim 5, wherein
the operation tool;
is supported by the subframe;
moves between a first position and a second position, wherein the operation tool at the first position contacts the insertion pin of the lock bar at the restriction position, and the operation tool at the second position contacts the insertion pin of the lock bar at the release position;
is biased in a direction oriented to the first position from the second position; and
moves the lock bar from the restriction position to the release position by being operated to move from the first position to the second position against a third biasing force.

7. The structure of the detachable front loader according to claim 1, wherein
once the main frame moves in a direction approaching the guide, the lock bar at the restriction position moves to an intermediate position between the restriction position and the release position against the first biasing force, and
once the main frame engages with the guide, the lock bar moves to the restriction position by the first biasing force, and restricts the main frame engaging with the guide from moving.

8. A detachable front loader comprising the structure according to claim 1.

9. A work vehicle comprising the detachable front loader according to claim 8.

10. The structure of the detachable front loader according to claim 2, wherein
once the locking tool at the unlocking position contacts the lock bar at the restriction position, the locking tool is restricted from moving to the locking position.

11. The structure of the detachable front loader according to claim 2, wherein
the guide comprises:
a hook that restricts the main frame from moving in a vertical direction; and
a contact surface that contacts the main frame and restricts the main frame from moving forward, wherein
an opening of the hook is oriented backward in a forward and backward direction, and
the hook interposes, from the vertical direction, a pin on the main frame.

12. The structure of the detachable front loader according to claim 3, wherein
the guide comprises:
a hook that restricts the main frame from moving in a vertical direction; and
a contact surface that contacts the main frame and restricts the main frame from moving forward, wherein an opening of the hook is oriented backward in a forward and backward direction, and the hook interposes, from the vertical direction, a pin on the main frame.

13. The structure of the detachable front loader according to claim 2, wherein the lock bar comprises:
a contact surface that contacts the main frame and restricts the main frame from moving; and
an insertion pin that receives a force from the operation tool; wherein
the pivot shaft part is disposed between the contact surface and the insertion pin.

14. The structure of the detachable front loader according to claim 3, wherein the lock bar comprises:
a contact surface that contacts the main frame and restricts the main frame from moving; and
an insertion pin that receives a force from the operation tool; wherein
the pivot shaft part is disposed between the contact surface and the insertion pin.

15. The structure of the detachable front loader according to claim 4, wherein the lock bar comprises:
a contact surface that contacts the main frame and restricts the main frame from moving; and
an insertion pin that receives a force from the operation tool; wherein
the pivot shaft part is disposed between the contact surface and the insertion pin.

16. The structure of the detachable front loader according to claim 2, wherein once the main frame moves in a direction approaching the guide, the lock bar at the restriction position moves to an intermediate position between the restriction position and the release position against the first biasing force, and
once the main frame engages with the guide, the lock bar moves to the restriction position by the first biasing force, and restricts the main frame engaging with the guide from moving.

17. The structure of the detachable front loader according to claim 3, wherein once the main frame moves in a direction approaching the guide, the lock bar at the restriction position moves to an intermediate position between the restriction position and the release position against the first biasing force, and
once the main frame engages with the guide, the lock bar moves to the restriction position by the first biasing force, and restricts the main frame engaging with the guide from moving.

18. The structure of the detachable front loader according to claim 4, wherein once the main frame moves in a direction approaching the guide, the lock bar at the restriction position moves to an intermediate position between the restriction position and the release position against the first biasing force, and
once the main frame engages with the guide, the lock bar moves to the restriction position by the first biasing force, and restricts the main frame engaging with the guide from moving.

19. The structure of the detachable front loader according to claim 5, wherein once the main frame moves in a direction approaching the guide, the lock bar at the restriction position moves to an intermediate position between the restriction position and the release position against the first biasing force, and
once the main frame engages with the guide, the lock bar moves to the restriction position by the first biasing force, and restricts the main frame engaging with the guide from moving.

20. The structure of the detachable front loader according to claim 6, wherein once the main frame moves in a direction approaching the guide, the lock bar at the restriction position moves to an intermediate position between the restriction position and the release position against the first biasing force, and
once the main frame engages with the guide, the lock bar moves to the restriction position by the first biasing force, and restricts the main frame engaging with the guide from moving.

\* \* \* \* \*